(12) United States Patent
Chugunov et al.

(10) Patent No.: US 11,755,146 B2
(45) Date of Patent: Sep. 12, 2023

(54) DEVICES AND METHODS FOR PROCESSING TOUCH INPUTS

(71) Applicant: Apple Inc., Cupertino, CA (US)

(72) Inventors: Aleksandr Chugunov, Cupertino, CA (US); Ari Y. Benbasat, San Jose, CA (US); Brent W. Schorsch, San Jose, CA (US); Michael T. Turner, San Jose, CA (US); Stephen C. Moseley, San Jose, CA (US); Steven S. Noble, Santa Cruz, CA (US); Giovanni M. Agnoli, San Mateo, CA (US); Jacob Z. Weiss, San Francisco, CA (US); Joshua C. Weinberg, Campbell, CA (US); Yiqiang Nie, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/747,931

(22) Filed: May 18, 2022

(65) Prior Publication Data

US 2022/0391067 A1 Dec. 8, 2022

Related U.S. Application Data

(60) Provisional application No. 63/196,651, filed on Jun. 3, 2021.

(51) Int. Cl.
*G06F 3/041* (2006.01)
*G06F 3/04845* (2022.01)
*G06F 3/04883* (2022.01)

(52) U.S. Cl.
CPC ...... *G06F 3/04166* (2019.05); *G06F 3/04845* (2013.01); *G06F 3/04883* (2013.01); *G06F 3/04184* (2019.05)

(58) Field of Classification Search
CPC ............ G06F 3/04166; G06F 3/04845; G06F 3/04883; G06F 3/04184; G06F 1/3262
See application file for complete search history.

(56) References Cited

U.S. PATENT DOCUMENTS

| | | | | |
|---|---|---|---|---|
| 8,416,196 B2 * | 4/2013 | Williamson | ............ | G06F 3/017 345/173 |
| 8,538,097 B2 * | 9/2013 | Russo | ................. | G06F 3/03547 382/124 |

(Continued)

OTHER PUBLICATIONS

International Search Report and Written Opinion, dated Sep. 15, 2022, received in International Patent Application No. PCT/US2022/031911, which corresponds with U.S. Appl. No. 17/747,931, 26 pages.

*Primary Examiner* — Michael J Jansen, II
(74) *Attorney, Agent, or Firm* — Morgan, Lewis & Bockius LLP

(57) ABSTRACT

An electronic device, detects a touch input. After a latency period, the device delivers to an application a sequence of input events that represent the touch input, including, in sequence: a first input event that represents the touch input at a first input time and is delivered at a first delivery time, a second input event that represents the touch input at a second input time and is delivered at a second delivery time, and a third input event that represents the touch input at a third input time and is delivered at a third delivery time, a time interval between the second input time and the second delivery time is smaller than a time interval between the first input time and the first delivery time, and a time interval between the third input time and the third delivery time is smaller than the time interval between the second input time and the second delivery time.

57 Claims, 18 Drawing Sheets

(56) References Cited

U.S. PATENT DOCUMENTS

| | | | |
|---|---|---|---|
| 8,566,045 B2* | 10/2013 | Shaffer | G06F 3/04883 |
| | | | 345/173 |
| 8,760,424 B2* | 6/2014 | Laubach | G06F 3/0235 |
| | | | 345/173 |
| 9,395,859 B1 | 7/2016 | Tate et al. | |
| 9,811,213 B2* | 11/2017 | Comstock | G06F 3/04186 |
| 10,332,297 B1* | 6/2019 | Vadodaria | G06F 3/0486 |
| 10,372,311 B2* | 8/2019 | Yamada | G06F 3/04845 |
| 2009/0225039 A1* | 9/2009 | Williamson | G06F 16/95 |
| | | | 345/173 |
| 2011/0179387 A1* | 7/2011 | Shaffer | G06F 3/0416 |
| | | | 715/835 |
| 2012/0007826 A1* | 1/2012 | Zheng | G06F 3/04883 |
| | | | 345/173 |
| 2012/0189166 A1* | 7/2012 | Russo | G06F 3/03547 |
| | | | 382/107 |
| 2012/0235938 A1* | 9/2012 | Laubach | G06F 3/04883 |
| | | | 345/173 |
| 2014/0267093 A1* | 9/2014 | Comstock | G06F 3/04186 |
| | | | 345/173 |
| 2015/0193062 A1 | 7/2015 | Wyatt | |
| 2016/0041732 A1* | 2/2016 | Yamada | G06F 9/451 |
| | | | 715/810 |
| 2017/0090583 A1* | 3/2017 | Zamora Esquivel | G06F 3/014 |
| 2018/0335922 A1 | 11/2018 | Nilo et al. | |

* cited by examiner

800

806 The touch input has a duration greater than a predefined threshold

808 The touch input includes movement of the touch input greater than a predefined movement threshold 810 Deliver to the application the sequence of input events that includes delivering a sequence of input events that replays the touch input at a rate that varies over time 812 The rate at which the touch input is replayed increases over time while at least a first portion of the touch input is replayed.

814 The rate at which the touch input is replayed decreases over time while at least a second portion of the touch input is replayed 816 A respective input event delivered to the application after the first input time and before the third delivery time represents a portion of the touch input having a duration determined based on a difference between a most recent input time and an input time represented by an input event delivered to the application immediately preceding delivery of the respective input event.

818 While delivering to the application the sequence of input events, change a user interface based on the touch input.

820 Changing the user interface includes moving one or more user interface elements based on a movement of the touch input 822 Changing the user interface includes changing an appearance of one or more user interface elements based on a duration of the touch input

824 The first delivery time is prior to the third input time such that the touch input continues to be detected after the first input event in the sequence of input events is delivered to the application

---

826 The method is performed at an electronic device, at least a portion of the electronic device having a first state and a second state, wherein in the first state the electronic device consumes less power than in the second state and in the second state the electronic device responds to inputs with a lower latency than in the first state, and the method includes detecting the touch input at the first input time while the portion of the electronic device is in the first state 828 In response to detecting the touch input at the first input time, enter the second state 830 Detect the touch input at the third input time while the portion of the electronic device is in the second state.

832 Deliver to the application a first input event in the sequence of input events at the first delivery time while the portion of the electronic device is in the second state

---

834 Detect a second touch input, and in accordance with a determination that the second touch input is a predefined second type of input, deliver to the application a single input event corresponding to the second touch input

---

836 Detect a third touch input, and in accordance with a determination that the third touch input is a predefined third type of input, deliver to the application two or more input events corresponding to the third touch input without varying a time interval between input times and delivery times for sequential input events of the two or more input events

838 The first input event is a first touch event that includes touch information, the second input event is a second touch event that includes touch information, and the third input event is a third touch event that includes touch information.

840 The method is performed at an electronic device, at least a portion of the electronic device having a first state and a second state, wherein in the first state the electronic device consumes less power than in the second state and in the second state the electronic device responds to inputs with a lower latency than in the first state, and the method includes providing an indicator in the first input event of the sequence of input events, the indicator specifying that at the first input time, the portion of the electronic device was in the first state.

---

842 Detect a fourth touch input; and determine if the fourth touch input is supported by the application, and in response to a determination that the fourth touch input is not supported by the application, forgo delivering to the application a sequence of input events based on the fourth touch input.

Figure 8D

DEVICES AND METHODS FOR PROCESSING TOUCH INPUTS

RELATED APPLICATIONS

This application claims priority to U.S. Provisional Patent Application No. 63/196,651, filed Jun. 3, 2021, which is hereby incorporated by reference in its entirety.

TECHNICAL FIELD

This relates generally to electronic devices with touch-sensitive surfaces, including but not limited to electronic devices with touch-sensitive surfaces that receive touch inputs.

BACKGROUND

The use of touch-sensitive surfaces as input devices for computers and other electronic computing devices has increased significantly in recent years. Touch-sensitive surfaces can include touchpads and touch-screen displays. Such surfaces are widely used to manipulate user interface objects on a display.

Exemplary manipulations include adjusting the position and/or size of one or more user interface objects or activating buttons or opening files/applications represented by user interface objects, as well as associating metadata with one or more user interface objects or otherwise manipulating user interfaces. Exemplary user interface objects include digital images, video, text, icons, control elements such as buttons and other graphics. A user will, in some circumstances, need to perform such manipulations on user interface objects in an image management application (e.g., Aperture, iPhoto, Photos from Apple Inc. of Cupertino, California), or a digital content (e.g., videos and music) management application (e.g., iTunes from Apple Inc. of Cupertino, California).

To conserve battery power, the electronic computing devices can have a lower energy consumption mode in which a user input detection rate and/or user interface display update rate is reduced. Touch inputs received during the lower energy consumption mode may experience a latency that leads to discrepancies between actual locations of touch inputs and how the touch inputs are reflected in user interfaces. For example, the user interfaces may be updated with a delay and may not timely reflect locations of the touch inputs when touch inputs are first received in the lower energy consumption mode.

SUMMARY

Accordingly, the present disclosure provides for electronic devices with faster, more efficient and accurate methods and interfaces for manipulating user interface objects. Such methods and interfaces optionally complement or replace conventional methods for manipulating user interface objects. Such methods and interfaces reduce the cognitive burden on a user and produce a more efficient human-machine interface. Further, such methods reduce the processing power consumed to process touch inputs, conserve power, improve accuracy of user inputs, reduce unnecessary/extraneous/repetitive inputs, and potentially reduce memory usage. For battery-operated devices, such methods and interfaces conserve battery power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is a portable device (e.g., a notebook computer, tablet computer, handheld device), or a wearable device (e.g., an electronic watch, sometimes called a smart watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include one or more (or two or more, or other subset) of: game playing, telephoning, video conferencing, appointment/event scheduling/calendaring, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors of the device. Alternatively, or in addition, executable instructions for performing these functions are, optionally, included in a transitory computer-readable storage medium or other computer program product configured for execution by one or more processors.

In accordance with some embodiments, a method is performed at an electronic device with a display and a touch-sensitive surface. In some embodiments, the electronic device, detects a touch input. After a latency period, the device delivers to an application a sequence of input events that represent the touch input, including, in sequence: a first input event that represents the touch input at a first input time and is delivered at a first delivery time, a second input event that represents the touch input at a second input time and is delivered at a second delivery time, and a third input event that represents the touch input at a third input time and is delivered at a third delivery time, where a time interval between the second input time and the second delivery time is smaller than a time interval between the first input time and the first delivery time, and a time interval between the third input time and the third delivery time is smaller than the time interval between the second input time and the second delivery time.

Thus, electronic devices with displays, touch-sensitive surfaces and optionally one or more sensors to detect intensity of contacts with the touch-sensitive surface, and optionally one or more sensors to detect signals from a stylus associated with the electronic device are provided with faster, more efficient methods and interfaces for manipulating user interface objects, thereby increasing the effectiveness, efficiency, and user satisfaction with such devices. Such methods and interfaces may complement or replace conventional methods for manipulating user interface objects.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8D are flow diagrams illustrating a method of delivering input events to an application in accordance with some embodiments.

Figure 1A:
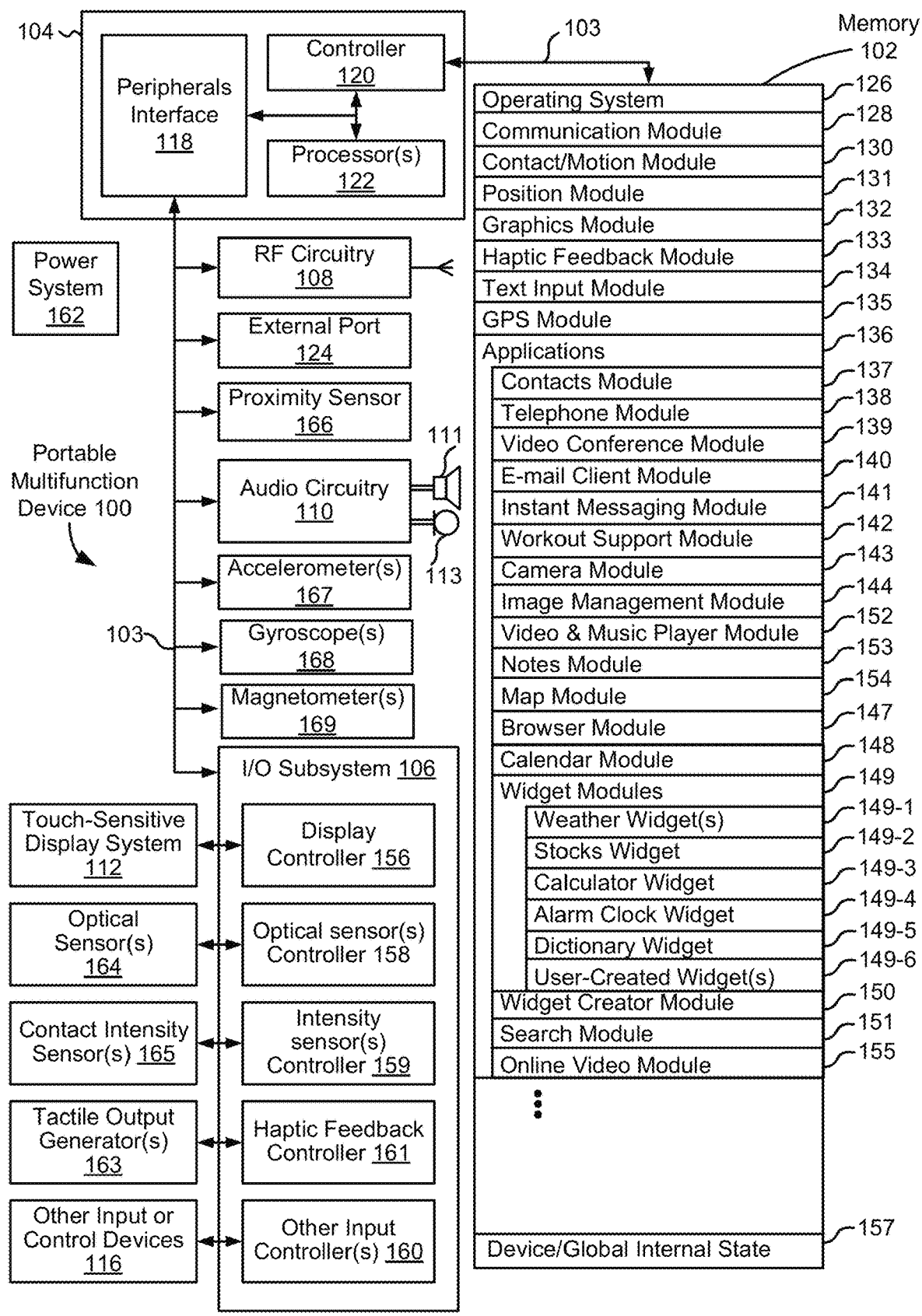
FIG. 1A is a block diagram illustrating a portable multifunction device with a touch-sensitive display in accordance with some embodiments.

Drawings are not drawn to scale unless stated otherwise.

DESCRIPTION OF EMBODIMENTS

Many electronic devices have graphical user interfaces that receive user inputs to manipulate user interface objects (e.g., moving a user interface object or creating a user interface object, such as drawing a line). Due to delays associated with hardware and/or software components in processing touch inputs, rapid movements of touch inputs lead to discrepancies between actual locations of touch inputs and how the touch inputs are reflected in user interfaces. For example, when a device transitions from a low energy consumption mode to a normal energy consumption mode while receiving a touch input, the user interfaces may be updated with a delay so that they may not timely reflect locations of the touch input. This creates a cognitive burden on a user, and may lead to errors in manipulating user interface objects. Furthermore, a sudden transition from an initial latency in delivering touch input information to an application, associated with the low energy consumption mode, to a lesser latency (e.g., normal latency) associated with the normal energy consumption mode may also create a cognitive burden on a user, and may lead to errors in manipulating user interface objects. As described below, a smooth transition from the initial latency to the normal latency reduces the cognitive burden on the user, by avoiding jarring or disorienting transitions in the displayed user interface, which helps to avoid user errors, allowing more accurate manipulation of user interface objects and, for battery powered device, more efficient use of the device's battery power.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more (or two or more, or a subset) of the following: a gaming application, a telephone application, a video conferencing application, a calendar application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips, an example of which is discussed in more detail below with reference to FIG. 5A.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some exemplary embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some exemplary embodiments, projected mutual capacitance sensing technology is used, such as that found in the iPhone®, iPod Touch®, and iPad® from Apple Inc. of Cupertino, California.

Touch-sensitive display system 112 optionally has an image resolution in excess of 100 dpi. In some embodiments, the touch screen image resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
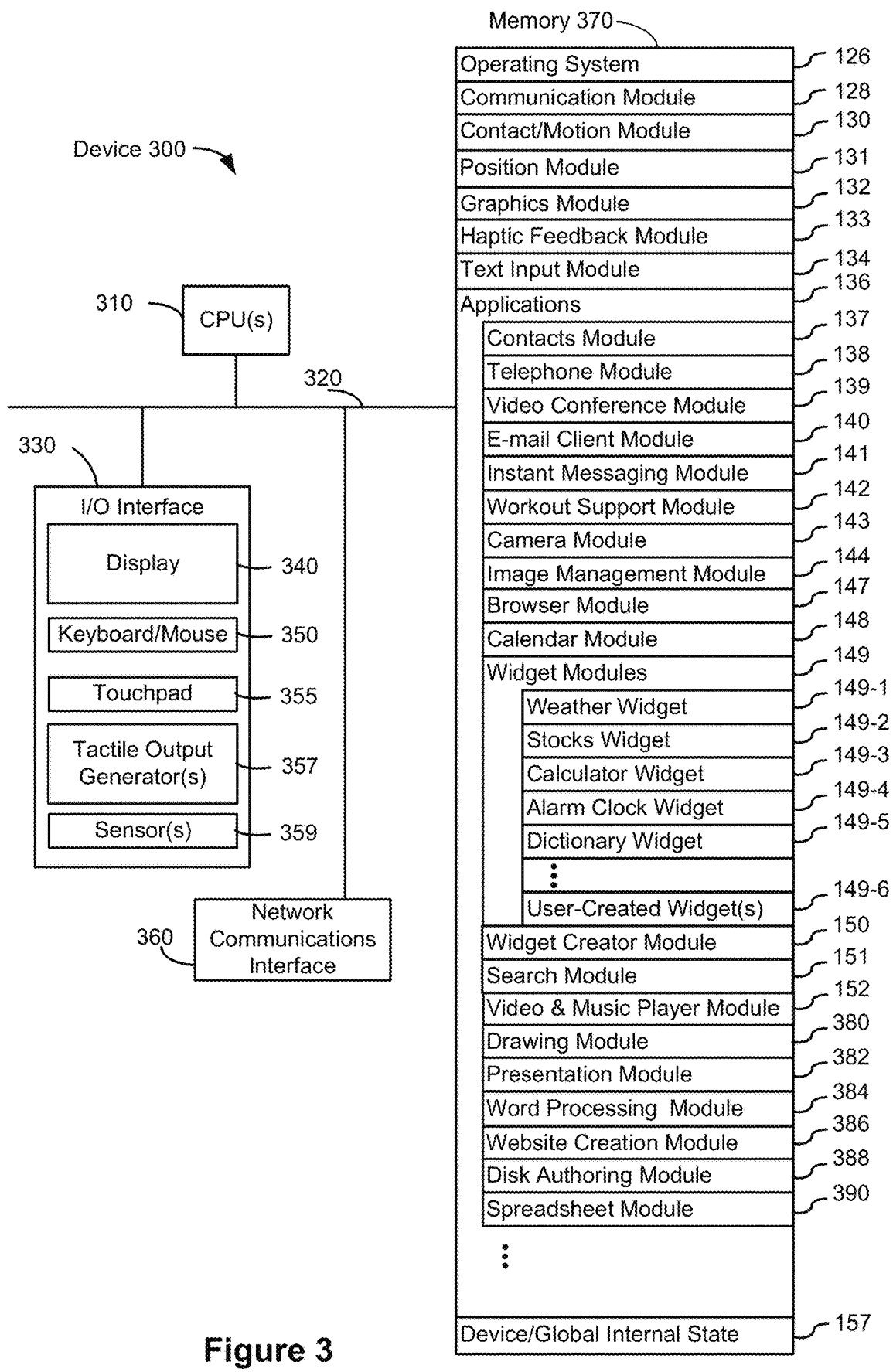
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 130 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., used by haptic feedback controller 161) to produce tactile output using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, reminder module 142, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
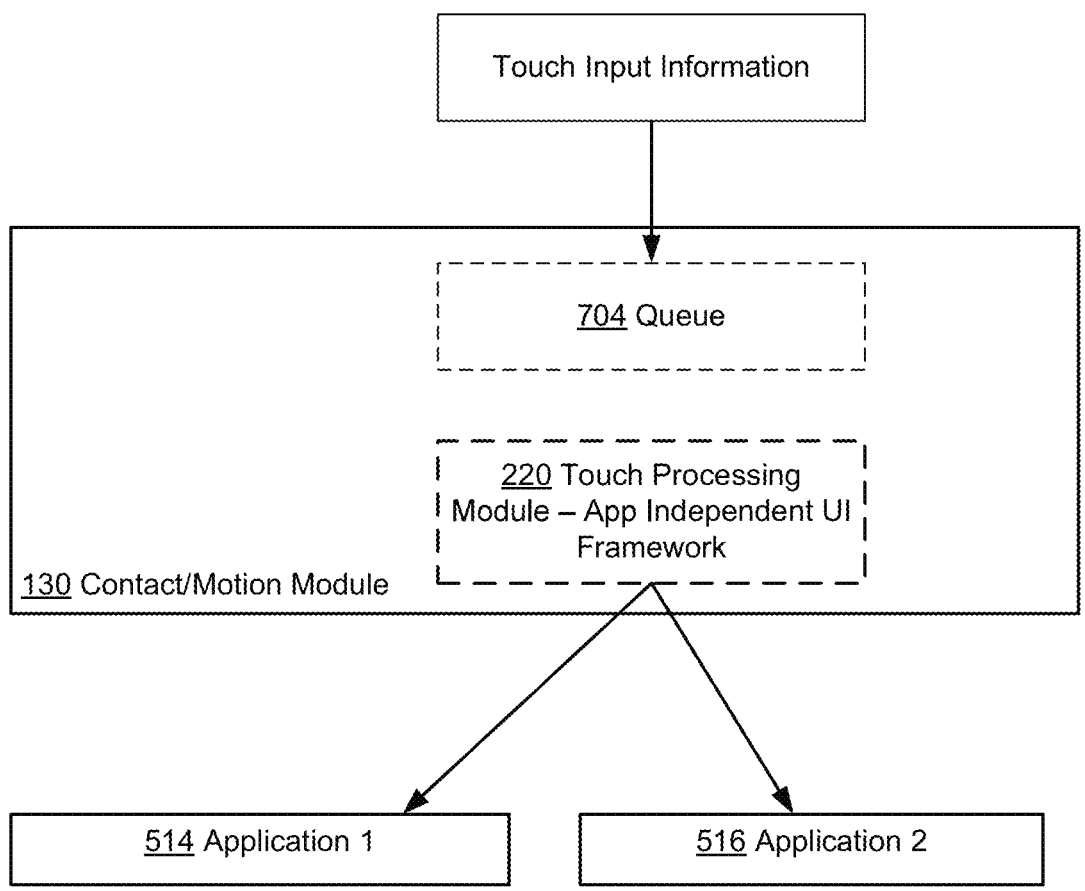
FIG. 1B is a block diagram illustrating transfer of touch information to one or more applications, in accordance with some embodiments.

FIG. 1B is a block diagram illustrating transfer of touch information to one or more applications, in accordance with some embodiments. As described above with respect to FIG. 1A, contact/motion module 130 determines status and/or a change in the status of a touch input, detected by a touch-sensitive surface (e.g., a touch-sensitive surface of touch-sensitive display system 112). In some embodiments, a sequence of touch input information, such as a sequence of input events 702 (see FIG. 7A) representing or corresponding to the touch input at a sequence of times, are initially stored in queue 704 (see FIG. 7A), which in some embodiments is implemented contact/motion module 130. Data structures of input events are discussed below with reference to FIG. 1C. In some embodiments, contact/motion module 130 includes a touch processing module 220, which is application-independent, and processes the touch input information and delivers touch input events to one or more applications 514, 516. For example, in some embodiments, the processing by touch processing module 220 is outside of the application(s) to which the touch input events are delivered, and the processing is independent of the application(s) to which the touch input events are delivered.

However, in some embodiments, touch processing module 220 receives information from the application(s), for example via an application programming interface (API), regarding the types of touch input that are supported by the application(s) (e.g., the types of touch inputs that the application(s) are configured to process or are capable of processing); and in some such embodiments, in accordance with a determination that a received touch in not supported by the application(s) (e.g., the applications to which touch inputs on the touch-sensitive surface are to be delivered), the touch processing module 220 or contact/motion module 130 forgoes delivering touch events for the received touch input to the application(s).

Figure 1C:
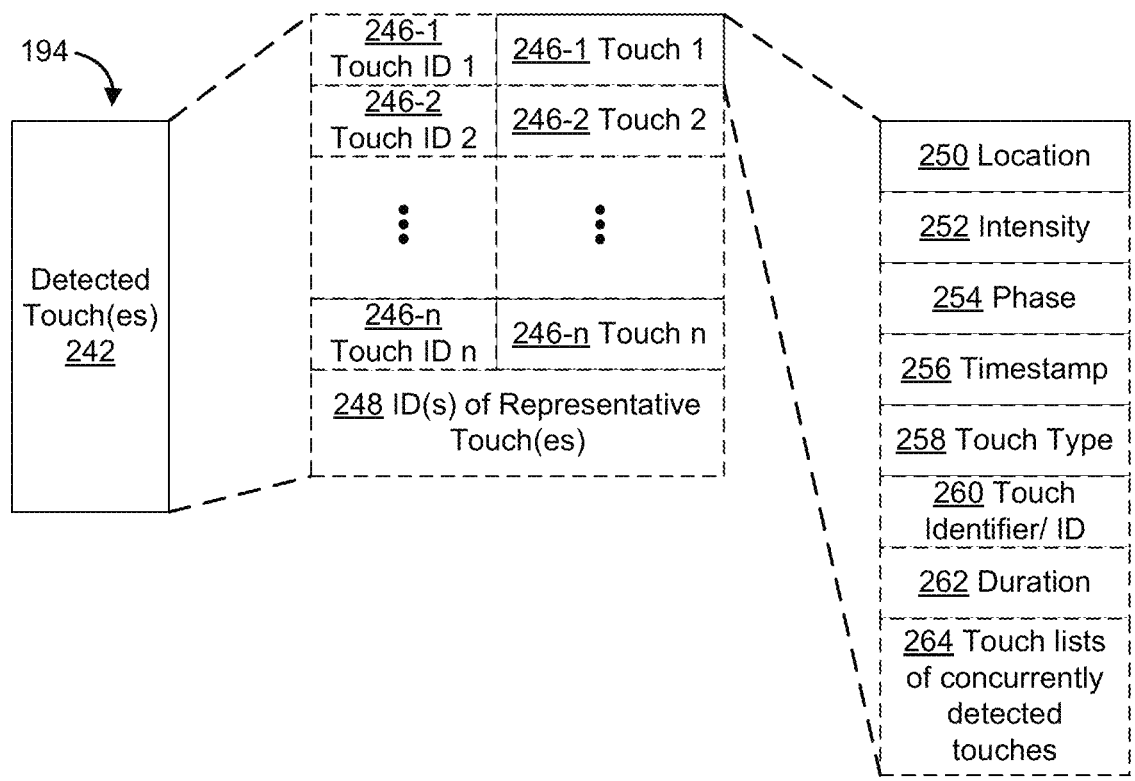
FIG. 1C is a block diagram illustrating a structure of an event object in accordance with some embodiments.

FIG. 1C is a block diagram illustrating a structure of event object 194 in accordance with some embodiments. Event object 194 includes detected touch information 242 that corresponds to one or more detected touches. In some embodiments, or in some circumstances (e.g., when more than one concurrent touch is detected), detected touch information 242 includes information for separate, concurrently detected touches (e.g., information 246-1 for touch 1, information 246-2 for touch 2, etc.). Detected touch information 246 for a respective detected touch optionally includes a touch identifier 260 that identifies the respective detected touch and that is distinct from the touch identifier of any other concurrently detected touch.

Information 246 for a detected touch includes location information 250 of a corresponding touch, and optionally includes one or more (or two or more) of: information 252 that identifies an intensity applied by the corresponding touch, phase information 254 that identifies a phase associated with the touch, a timestamp 256 of the corresponding touch (e.g., timestamp 256 indicates a time when the corresponding touch was detected), and/or type 258 of the corresponding touch (e.g., whether the corresponding touch is made with a finger or a stylus). In some embodiments, the phase information 254 for a detected touch has one of a predefined set of phase values, such as a "began" phase, indicating that the event object is for an initial detection of the touch input, a "change" phase, indicating that the event object reflects a changed position of a previously detected touch input, a "continue" phase, indicating that the event object is for a previously detected touch input, or an "end" phase, indicating that the event object corresponds to an end (e.g., liftoff) of the touch input. In some embodiments, the values for some of these fields, such as the location information 250 and timestamp 256 for a respective detected touch are generated by interpolating between corresponding values for two or more detected touches. In some embodiments, the information 246 for a detected touch includes a duration 262, which indicates how long (e.g., a length of time over which) the touch has persisted. In some embodiments, the detected touch information 242 includes one or more lists 248 of concurrently detected touches (e.g., a list of the touch identifiers of concurrently detected touches).

Figure 2:
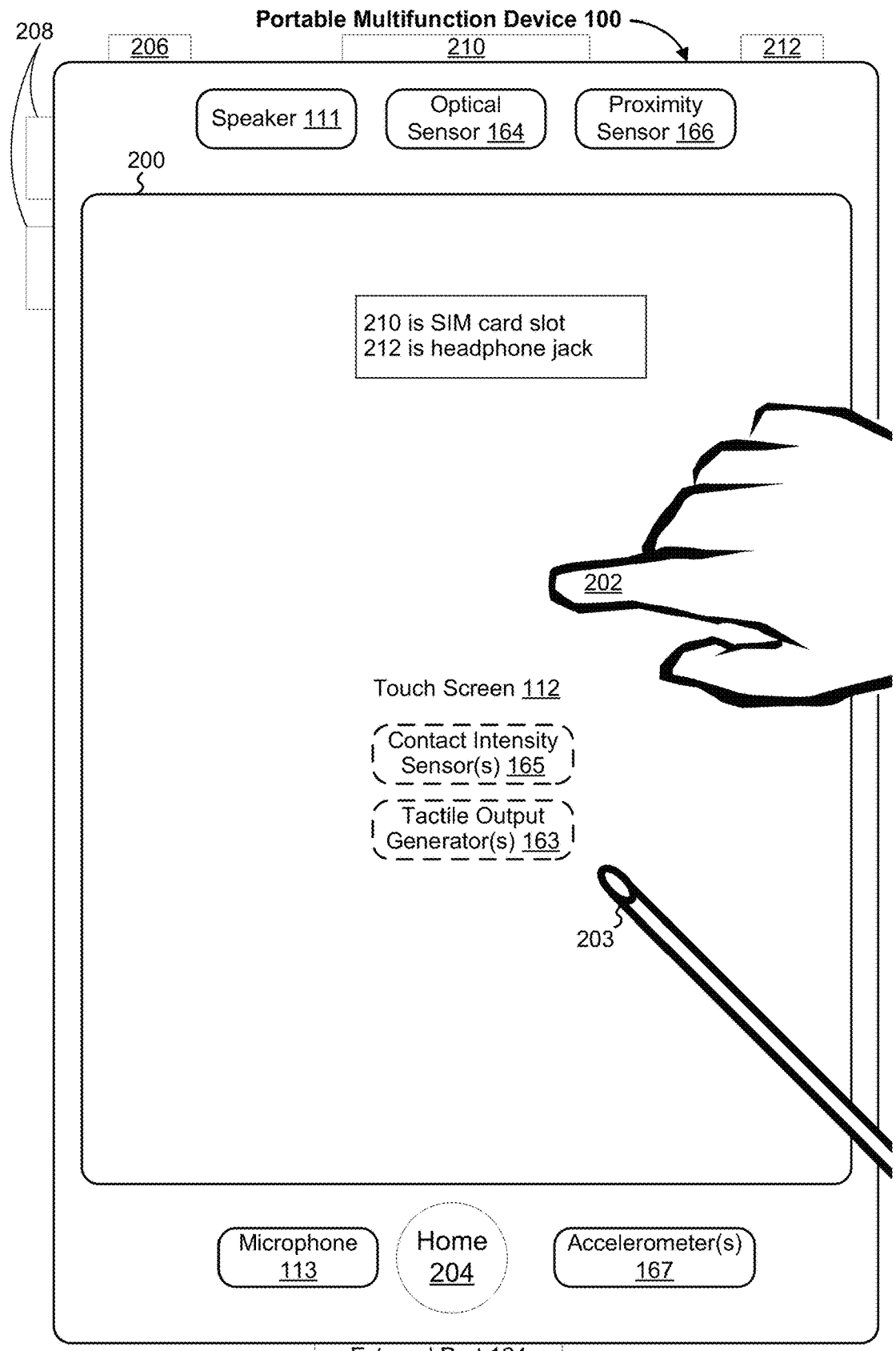
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of a multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, a control device (e.g., a home or industrial controller), or a wearable device, such as an electronic watch. Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 370 of the device 300 optionally stores a subset of the modules and data structures identified above. Furthermore, memory 370 of the device 300 optionally stores additional modules and data structures not described above.

Figure 4:
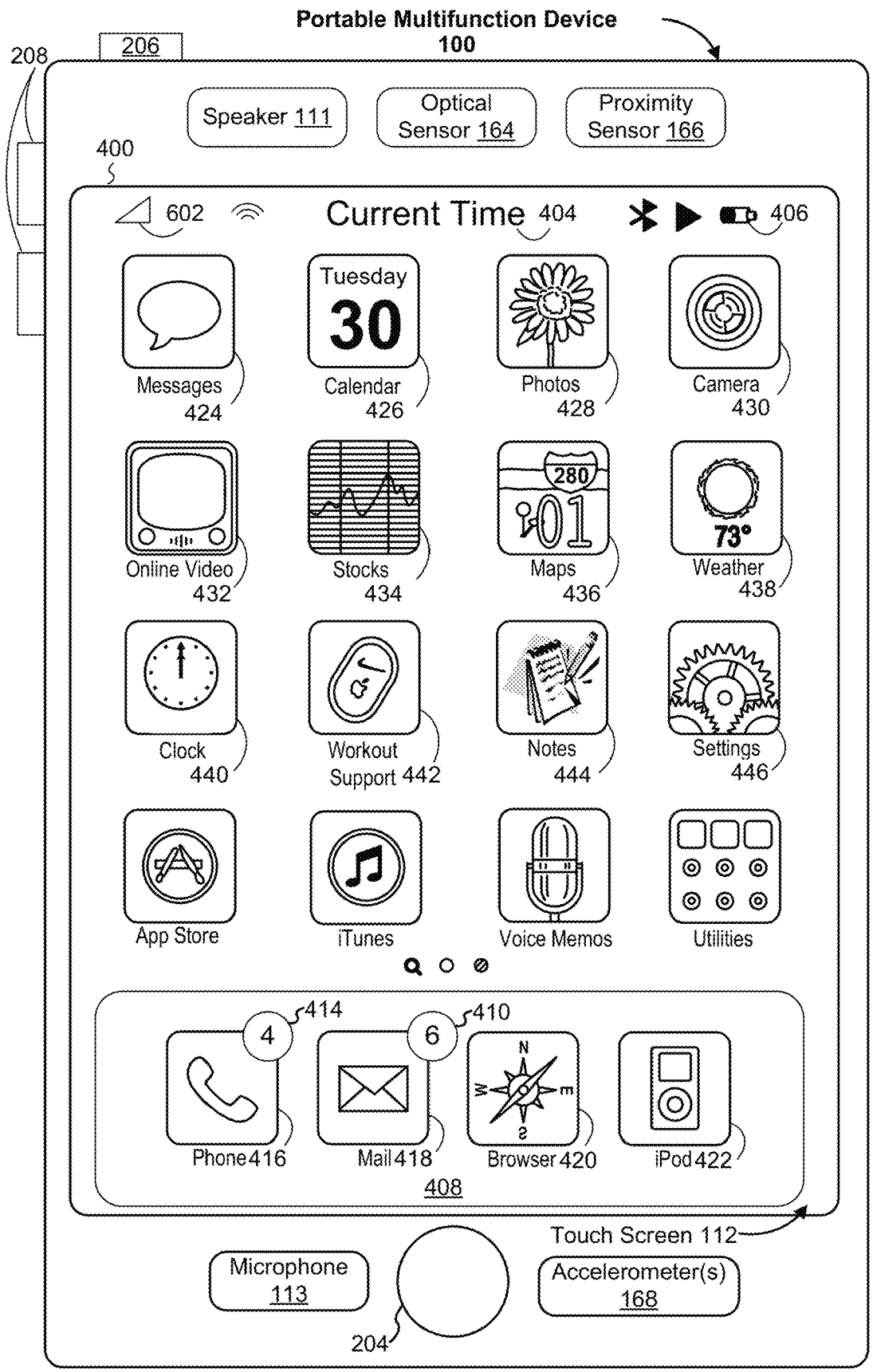
FIG. 4 illustrates an exemplary user interface for a menu of applications on a portable multifunction device in accordance with some embodiments.

FIG. 4 illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as one or more (or two or more) of:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 169-6, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4 are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5A:
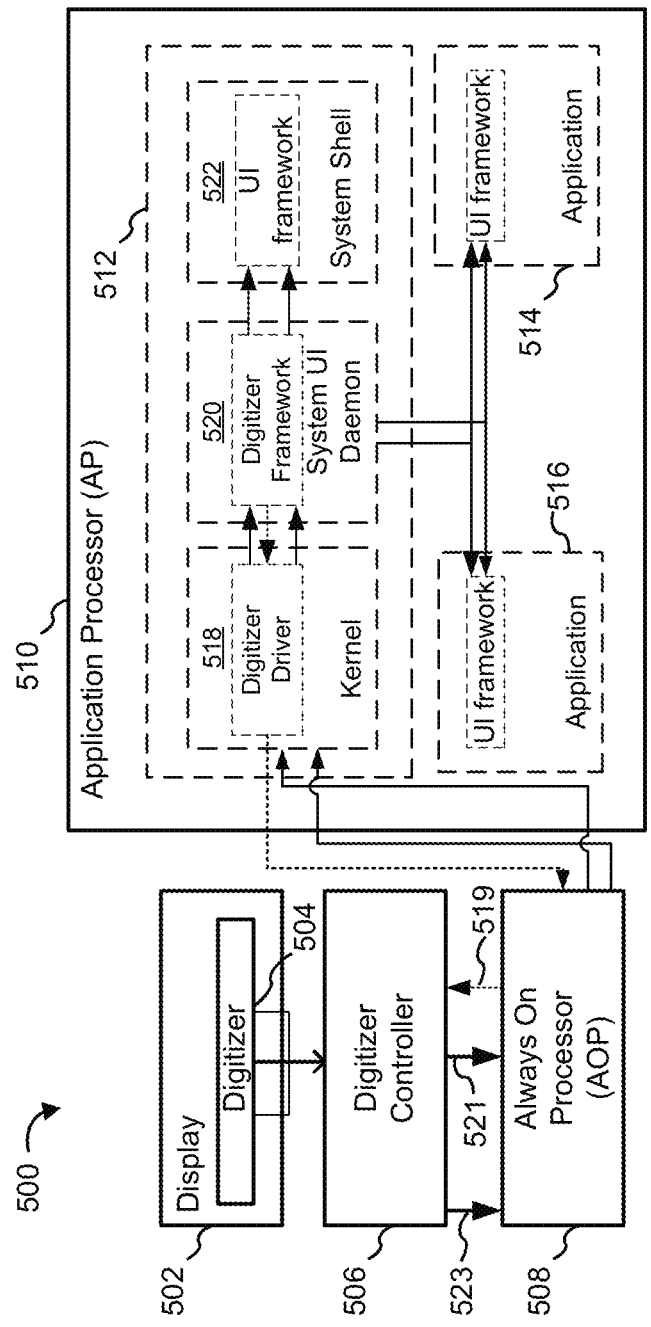
FIG. 5A shows a system level diagram of a device 500 in accordance with some embodiments.

FIG. 5A shows a system level diagram of an electronic device 500 in accordance with some embodiments. Components illustrated by rectangular boxes having solid line boundaries are hardware components and components illustrated by rectangular boxes having dashed line boundaries are software components. The device 500 includes a touch-sensitive display 502, that is in communication with a digitizer 504 to receive touch inputs and convert the touch inputs into digital signals. The digitizer 504 is controlled by a digitizer controller 506, which in turn receives and delivers data signals and/or control signals to an Always On Processor (AOP) 508. The AOP 508 processes at least a portion of the data signals received from the digitizer controller 506. The AOP 508 also receives and delivers data signals and/or control signals to an Application Processor (AP) 510.

The AP 510 includes a set 512 of software components (sometimes herein called application-independent software components) that are application-independent, and also includes application-dependent software components, such as a first application 514 and second application 516. In this example, the set 512 of application-independent soft components includes a kernel 518 and its associated digitizer driver, a system UI daemon 520 and its associated digitizer framework, system shell 522, and the UI framework, which is a shared framework to which the system shell 522 and applications 514 and 516 link to utilize common functionality, including touch gesture recognition.

In some embodiments, the display 502 is configured to display a user interface at a particular display rate (also called a display refresh rate). For example, display 502 refreshes a user interface at 60 Hz (e.g., at a rate of 60 updates per second). In some embodiments, the display rate is a fixed display rate. As used herein, a display frame refers to a user interface that is displayed during a single display cycle (e.g., a user interface that is displayed for approximately 0.1667 second when the display rate is 60 Hz, and subsequently replaced with a subsequent user interface).

In some embodiments, the display 502 has a touch-sensitive surface configured to detect a touch input at a particular detection rate. In some embodiments, the detection rate is one of two fixed detection rates (e.g., either 20 Hz or 60 Hz), depending on an energy consumption mode of the device 500.

In general, there are delays between detecting a touch input and updating a user interface in response to the touch input, such as touch processing delays, caused by processing the touch input, and application processing delays, caused by preparing an update to the user interface being prepared by a software application (prior to rendering the user interface). Such delays can lead to a discrepancy between a physical location of a touch input on display 502 and updates to a user interface displayed on display 502. The total delay between detection of an input and a corresponding update to the user interface on display 502 is sometimes called the latency.

Dotted arrows 519 (only a single annotation for the dotted arrows 519 is shown in FIG. 5A) represent a first sequence of data and/or control signal movements between various hardware components and software components. Solid arrows 521 (only a single annotation for the solid arrows 521 is shown in FIG. 5A) represents a second sequence of data and/or control signal movements between various hardware components and software components. Gray arrows 523 (only a single annotation for the gray arrows 523 is shown in FIG. 5A) represent a third sequence of data and/or control signal movements between various hardware components and software components.

In a first stage of operation, the system shell 522 detects an opportunity that allows the device 500 to enter a first state (e.g., a lower energy consumption state) of operation. In some embodiments, the first state allows the device 500 to conserve energy (e.g., battery power) by reducing a display refresh rate of the display 502 and/or reducing a detection rate of the digitizer 504 for user input. The detection mode that has a lower detection rate or detection frequency (e.g., less than 30 Hz, 20 Hz, 10 Hz, 5 Hz) may be considered an "inactive touch detection mode." In contrast, when the device 500 is in a second state (e.g., a normal energy consumption state, or higher energy consumption state), the device 500 may have a higher display refresh rate for the display and/or higher detection rate of the digitizer 504 compared with the refresh rate and/or detection rate when the device is the first state. The detection mode that has a higher detection rate or detection frequency (e.g., higher than 40 Hz, 50 Hz, or 60 Hz, and in some embodiments up to 120 Hz) may be considered an "active touch detection mode."

In some embodiments, the device 500 has predefined criteria for transitioning to the first state (e.g., a lower energy consumption state), and in some embodiments the predefined criteria include a first criterion that is satisfied when the touch-sensitive display 502 of the device 500 does not receiving any user input for a pre-determined period of time. In some embodiments, the predefined criteria for transitioning to the first state include a second criterion with respect to inactivity (e.g., a level of activity below a threshold) by software applications in the device. In some embodiments, a user of device 500 may select or schedule a time window for the device 500 to automatically switch into the first state.

In some embodiments, the system shell 522 instructs the System UI daemon 520 to switch to the inactive detection mode. The system UI daemon 520 forwards the instruction from the system shell 522 to the digitizer controller 506, and in response the digitizer controller 506 switches to a lower energy consumption state (e.g., a power saving mode). The digitizer controller 506 in the lower energy consumption state analyzes touch signals received from the digitizer 504 at a reduced frequency (e.g., downshifts from a frequency higher than 50 Hz to frequency lower than 30 Hz, for example downshifts from a detection frequency of 60 Hz to a detection frequency of 20 Hz). Touch detection by the digitizer 504 and touch gesture detection by digitizer controller 506 continue in the lower energy consumption state, albeit with a lower frequency of touch detection.

Further, in some embodiments, when device 500 is in the lower energy consumption state, the AP 510 may operate in a sleep mode, during which only a predefined set of operations (e.g., updating a time element in a user interface) are performed, and those operations are performed at a low rate of execution, so as to conserve energy, and for battery-powered device, to conserve battery power.

In some embodiments, in the lower energy consumption state, the digitizer controller 506 forgoes reporting touch signals to the AOP 508 until any touch gesture of a predefined set of touch gestures is recognized. For example, the predefined set of touch gestures may include a 1-finger swipe, a 1-finger long press, and a 1-finger tap. In some embodiments, the predefined set of touch gestures that the digitizer controller 506 is configured to recognize also include one or more multiple-finger gestures. In response to recognizing any of the predefined set of touch gestures, the digitizer controller 506 begins (or resumes) reporting touch signals to the AOP 508.

In a second stage of operation, the digitizer controller 506 detects a touch input while device 500 is in the lower energy consumption mode. For example, a user starts interacting with the device 500 and the digitizer 504 receives (e.g., detects) touch inputs from the user. The digitizer controller 506 analyzes the touch inputs to determine whether the touch inputs correspond to any touch gesture in the predefined set of touch gestures.

Figure 5B:
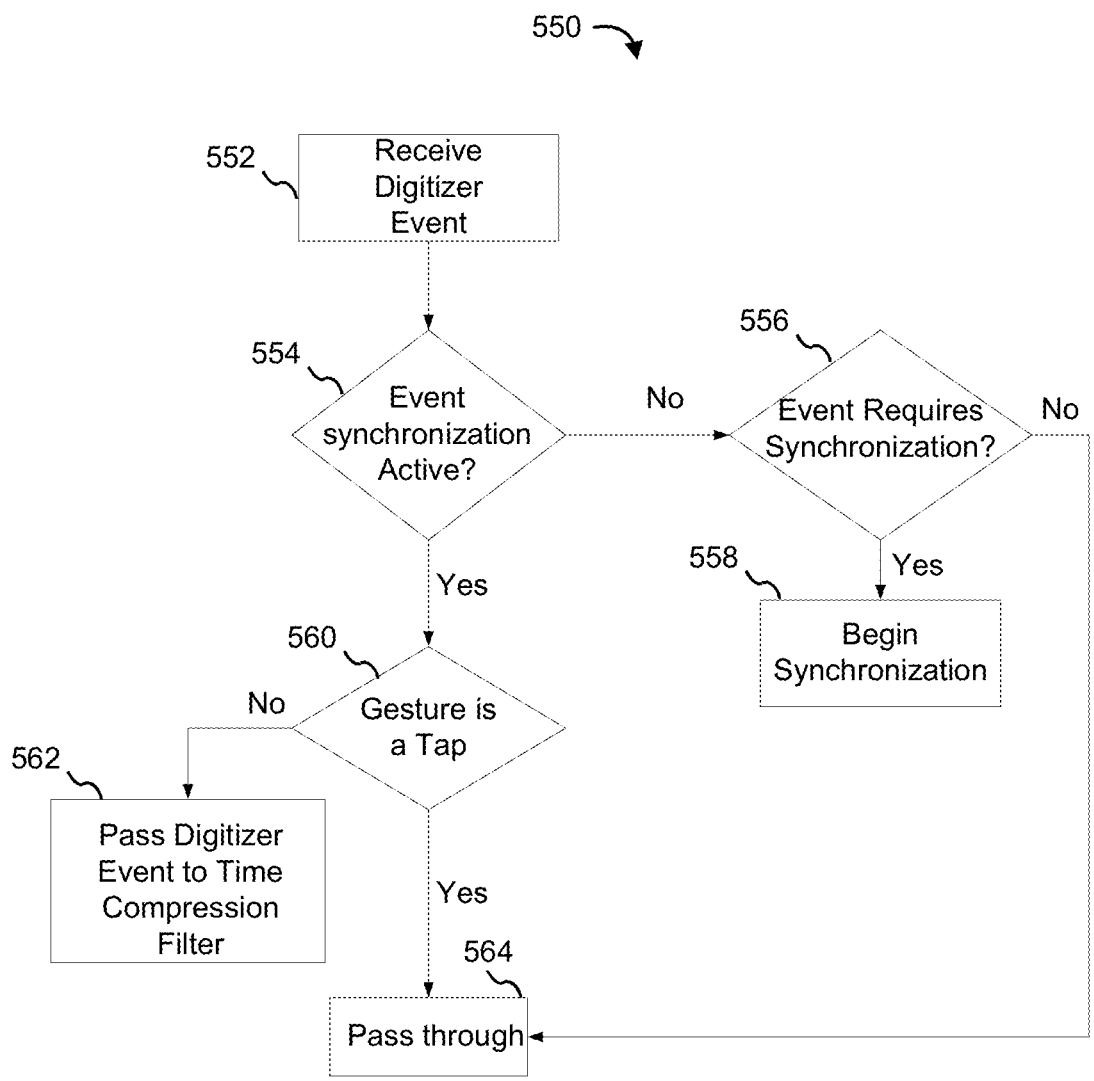
FIG. 5B depicts an example process flow executed in the user interface framework of an application dependent software component of an application processor, in accordance with some embodiments.

In some embodiments, if the detected touch input fails to match any of the predefined set of touch gestures, the detected touch input is rejected as accidental, or non-conforming, or not-recognized touch inputs, and are not reported to the AOP 508. Similarly, in some embodiments, in accordance with a determination that the detected touch input is not supported by the application to which touch inputs are to be delivered (e.g., an application for which a user interface is currently displayed), the detected touch input is not delivered to the application, e.g., by not reporting the digitizer events for the touch input to the AOP 508. In such circumstances, the processing of digitizer events illustrated in FIG. 5B is not performed, since digitizer events for such touch inputs are not conveyed to the AOP 508 and AP 510.

When the digitizer controller 506 detects a touch input that corresponds to a recognized touch gesture (e.g., any of the touch gestures in the predefined set of touch gestures), it responds to recognizing the touch gesture by sending an initial report about the detected touch input to the AOP 508. In some embodiments, the initial report to the AOP 508 includes an indication of the type of touch gesture that has been recognized, a timestamp and location of the touch input (e.g., on display 502) at which the touch input was initially detected, corresponding to when a user started interacting with the display, and a timestamp and location of the touch input corresponding to time at which the touch gesture was recognized. The initial report thus contains information about the time lapse between when the touch input was first detected and when the touch input was recognized (prior to any delivery by the AP 510 to an application). The initial report also provides an indication of a distance moved by the touch input, assuming a continuous touch input from that lasts from the time of the initial detection to the time of recognition, by providing the locations of the touch input at the time of initial detection and at the time of touch gesture recognition.

In some embodiments, the digitizer controller 506 also responds to detecting a recognized touch gesture by transitioning to an active touch detection mode (e.g., a normal, higher energy consumption state), and upshifts the frequency of touch input detection and processing from the reduced frequency (e.g., 20 Hz, or more generally, a frequency at or less than 30 Hz, at or less than 25 Hz, at or less than 20 Hz, or at or less than 10 Hz), to the normal, higher frequency (e.g., 60 Hz, or more generally a frequency at or above 40 Hz, at or above 50 Hz, at or above 60 Hz, at or above 80 Hz, or at or above 100 Hz, and typically at or less than 120 Hz).

In some embodiments, the device 500 (e.g., the digitizer controller 506) may take up to 300 ms to recognize the touch input as a recognized touch gesture. Thus, if the detection rate is at 20 Hz in the lower energy consumption state, up to 6 user inputs may be detected (e.g., at a detection rate of 20 Hz) prior to the digitizer controller 506 recognizing the touch input as a recognized touch gesture.

Once the AOP 508 receives the initial report, the AOP 508 processes the data in the report and wakes the AP 510, if the AP 510 was in the sleep mode, and sends the processed data to the kernel 518. Waking the AP 510 transitions the AP 510 from a sleeping mode to an awake mode, and from a lower energy consumption state to a higher consumption state.

The AP 510 includes (e.g., executes) digitizer software that synthesizes initial digitizer events based on one or more of: the processed data sent by the AOP 508 and the initial report sent by digitizer controller 506. In some embodiments, the digitizer software for synthesizing the digitizer events is provided in or by the digitizer driver of the kernel 518. In some embodiments, the digitizer software is provided in or by the digitizer framework of the system UI daemon 520. In some embodiments, the synthesized initial digitizer events are marked as "inactive mode originated" to indicate that they are based on user input received while the device 500 is in the lower energy consumption state.

The system UI daemon 520 receives and processes (or "consumes") the synthesized initial digitizer events and routes these initial digitizer events to relevant application processes (e.g., the first application 514 and/or the second application 516). In some embodiments, the relevant application processes correspond to the user interface element most recently displayed on the display 502 before the device 500 entered the lower energy consumption state. Alternatively or in addition, synthesized initial digitizer events marked as "inactive mode originated" are routed to one or more specific, predefined applications. In some embodiments, the application that receives the digitizer events updates a user interface using the information in those events, using the information about the location of a touch input over the course of a detected gesture to determine updates to the user interface.

In some embodiments, a time period of about 100 ms (e.g., between 80 ms to 120 ms, or between 50 ms to 150 ms) elapses between the moment the device 500 recognizes the touch gesture to the moment the UI framework in each relevant application process receives the initial digitizer event, when the device 500 wakes up from the lower energy consumption state (e.g., a "sleep mode," where one or more of the digitizer controller 506, the AOP 508, and/or the AP 510 are in the lower energy consumption state) to the higher energy consumption state. Thus, if device 500 is in the lower energy consumption state when a user first begins interacting with the display, a total time period of up to 400 ms (e.g., between 300 ms to 500 ms, or between 200 ms to 600 ms) may elapse between the time the user first begins interacting with the display 502 and delivery of initial digitizer events to the one or more relevant applications.

The touch event processing software provided by the UI framework (e.g., shared by the respective first application 514, second application 516, and system shell 522) identifies the initial digitizer events as corresponding to touch inputs detected during the inactive touch detection mode and enters an event synchronization mode. During the event synchronization mode, normal event delivery to the application is halted and events delivered by the system UI daemon 520 to the first application 514 and/or the second application 516 are passed to an event synchronization filter (e.g., event synchronization filter 700 shown in FIG. 7A) for processing. In some embodiments, the event synchronization filter is implemented within the UI framework to which each application (e.g., 514, and 516) is linked.

In some embodiments, the event synchronization filter is implemented by the system shell 522, which links to UI framework to access the UI framework's touch event processing functionality, and thus outside the application(s) which receive touch events from the event synchronization filter. Alternatively, the event synchronization filter is implemented within the System UI daemon 520. In such embodiments, applications 514, 516 receive touch events that have already been processed by the event synchronization filter.

The event synchronization filter, upon receiving the events delivered by the system UI daemon 520, starts to synthesize new events at the frequency of the display refresh rate of the higher energy consumption state. In some embodiments, the display refresh rate of the higher energy consumption state is 60 Hz, or at or above 50 Hz, or at or above 40 Hz, or more than 60 Hz, or at or above 80 Hz, or at or above 100 Hz, and is typically at or less than 120 Hz. In some embodiments, the display refresh rate when the device 500 is in the lower energy consumption state is 20 Hz, or a frequency at or less than 40 Hz, or a frequency at or less than 20 Hz, or a frequency at or less than 10 Hz.

In some embodiments, the system shell 522 disables the inactive touch detection mode during this second stage of operation (e.g., at the end of the second stage of operation, in conjunction with the event synchronization filter beginning to synthesizing new events at the frequency of the display refresh rate, or in conjunction with the AOP 508 waking the AP 510). At the end of the second stage of operation, the digitizer controller 506 and the digitizer 504 are in the higher energy consumption state in which the digitizer 504 detects touch gesture at a normal, increased frequency and the digitizer controller 506 conducts touch signal analysis at a normal, increased frequency. Both the AOP 508 and the AP 510 are in the "awake" mode (e.g., higher energy consumption state) at the end of the second stage of operation.

In a third stage of operation, the device 500 continues to process touch gestures as long as the user's interaction with the display 502 continues. In some embodiments, user interaction includes (previous) touch input or events that are stored in a queue waiting to be processed by the event synchronization filter. In the third stage of operation, while the event synchronization filter begins synthesizing new events at the frequency of the display refresh rate, the user may continue to interact with the display 502 (e.g., if the user's finger is still touching the display 502). In that case, the digitizer controller 506 continues to deliver reports to the AOP 508. In some embodiments, the reports each include a position and a time stamp associated with the touch input. The reports can optionally include an indication about the type of gesture that was recognized. However, the resulting touch events are no longer marked as "inactive mode originated" because the touch inputs in the third stage of operation are received by the digitizer 504 and analyzed by the digitizer controller 506 at the higher (e.g., "normal") frequency, such as 60 Hz (e.g., between 50 Hz-70 Hz).

In some embodiments, the touch inputs detected during the third stage of operation are also collected in the same queue as the touch events detected in the second stage of operation because normal event delivery to the application is halted until the synchronization filter completes synchronization. The events generated based on the touch inputs detected during the third stage of operation are not classified as "inactive mode originated," but may be collected in the queue until event synchronization is complete, e.g., when the touch position of a most recent synthesized event and the touch position of the most recent event in the queue are equal, or when all inactive mode originated events have been processed by the event synchronization filter.

In third stage of the operation, the AOP 508 continues to process the data received from the digitizer control 506 at the normal frequency associated with the higher energy consumption mode, and sends the resulting processed data to the kernel 518 in the AP 510.

In some embodiments, the same digitizer software (e.g. the synchronization filter) in the AP 510 that began synthesizing digitizer events now synthesizes digitizer events in the third stage of operation based on one or more of: the processed data sent by the AOP 508 and the report sent by digitizer controller 506. In some embodiments, the synthesized digitizer events produced in the third stage of operation are no longer marked as "inactive mode originated." The system UI daemon 520 receives and processes (or "consumes") these digitizer events and routes them to the relevant applications (e.g., application processes). The synchronization filter continues to synthesize events until synchronization is completed.

Prior to the completion of synchronization, the event synchronization filter keeps synthesizing new events at the frequency of the display refresh rate (e.g., 60 Hz). In some circumstances, synchronization completes when the stream of digitizer events (e.g., from a queue) ends due to the user no longer interacting with the display 502. Alternatively, the event synchronization filter keeps synthesizing new events until all input touch events (e.g., that are previously in a queue) have been processed and a position (e.g., a synthesized position associated with the most recent output event synthesized by the event synchronization filter) of the most recent output event matches the position (e.g., the position of the input event retrieved from the queue) of the most recent input event received by the UI framework (e.g., the portion of the UI framework in the system shell 522).

FIG. 5B depicts an example process 550 executed by the AP 510, in the UI framework of an application 514 or 516, or in the UI framework of the system shell 522, in accordance with some embodiments. In process 550, the UI framework receives (552) a digitizer event from the system UI daemon 520. The digitizer event from the system UI daemon 520 includes, for example, the initial digitizer event generated by the digitizer software of the kernel 518 and/or the system UI daemon 520 during the second stage of operation, and all subsequent digitizer events generated by the digitizer software during the second stage or the third stage of operation.

After receiving (522) the digitizer event at the step 552, the UI framework determines (554) if event synchronization is active. In some embodiments, event synchronization is activated when a digitizer event marked as "inactive mode originated," indicating that touch input was received by the digitizer 504 when the device 500 was in the lower energy consumption mode, is received by the UI framework. In accordance with a determination that event synchronization is active (554—Yes), the UI framework determines (560) if the touch input in the digitizer event is a tap gesture. In some embodiments, a touch input having a duration less than a predefined threshold is identified as a tap gesture. As described in FIG. 5A, in some embodiments the initial report also includes information about the type of gesture that was recognized, and the digitizer event may use the information in the initial report to determine if the touch input in the digitizer event is a tap gesture. In accordance with a determination (560—Yes) that the gesture is a tap, the UI framework directly passes (564) the digitizer event to the application without further processing. On the other hand, in accordance with a determination that the gesture is not a tap (560—No), the UI framework passes (562) the digitizer event to a time compression filter, sometimes called the synchronization filter, discussed below with reference to FIG. 7A. Thus, a touch input having a duration greater than a predefined threshold (e.g., a touch input that is not a tap) is passed to the time compression filter.

In accordance with a determination (554—No) that event synchronization is not active (e.g., the digitizer event does not represent a touch input that was detected when the device 500 is in a lower energy consumption mode), the UI framework makes a determination (556) of whether the digitizer event requires synchronization. Further, in accordance with a determination (556—No) that the digitizer event does not require synchronization, the UI framework directly passes (564) the digitizer event to the application without further processing. On the other hand, in accordance with a determination (556—Yes) that the digitizer event does require synchronization, the UI framework begins synchronization (558), for example by activating the time compression filter and passing the digitizer event to the time compression filter.

With respect to the determination 554, there are at least three different reasons that event synchronization might not be active: 1) the current touch gesture was first received while the device 500 is in a normal, higher energy consumption mode, and thus synchronization is not needed; 2) a new touch gesture is being received, and the device has not yet determined that synchronization is needed; or 3) synchronization of the current touch gesture has been completed, and the digitizer events for the remainder of the touch gesture do not require synchronization. In either case, process 550 next determines (556) whether the received digitizer event requires synchronization.

Similarly to determination 554, there are at least three different situations that need to be taken into account in making determination 556 of whether the received digitizer event requires synchronization: 1) if the received digitizer event is part of a touch gesture that was first received while the device 500 is in a normal, higher energy consumption mode, synchronization is not needed, and therefore the UI framework directly passes (564) the digitizer event to the application without further processing; 2) if the received digitizer event is the first digitizer event for a touch gesture that began while the device 500 was in a lower energy consumption mode, then synchronization is needed and the UI framework begins synchronization (558); and 3) if the received digitizer event is part of a touch gesture for which synchronization has been completed, no further synchronization is needed, and therefore the UI framework directly passes (564) the digitizer event to the application without further processing. In some embodiments, if there are any digitizer events left in the time compression filter's queue (e.g., input event queue 704, FIGS. 7A and 7B), synchronization is active and not yet complete, and therefore the received digitizer event is passed (562) to the time compression filter.

As discussed in more detail below, the time compression filter, also sometimes called the synchronization filter, transforms (e.g., replaces) an original sequence of digitizer events (e.g., received from the system UI daemon 520 that originate from detected touch inputs), which represent a detected touch input, into a modified (e.g., synthesized) sequence of input events that are delivered to an application. Due to the amount of time required to determine if the touch input corresponds to a recognized gesture that is to be delivered to an application, and to transition at least a portion of the device 500 from a low energy consumption mode, in use when a first portion of touch input is detected, to a normal, higher energy consumption mode, there can be a considerable latency (e.g., 300 to 500 ms) between the touch input first being detected and delivery of a first corresponding event to an application. The time compression filter is used to gradually reduce the latency between events representing samples of the touch input and delivery of corresponding touch information to the application, thereby providing a smooth transition to normal, low-latency delivery of touch information to the application.

Figure 6A:
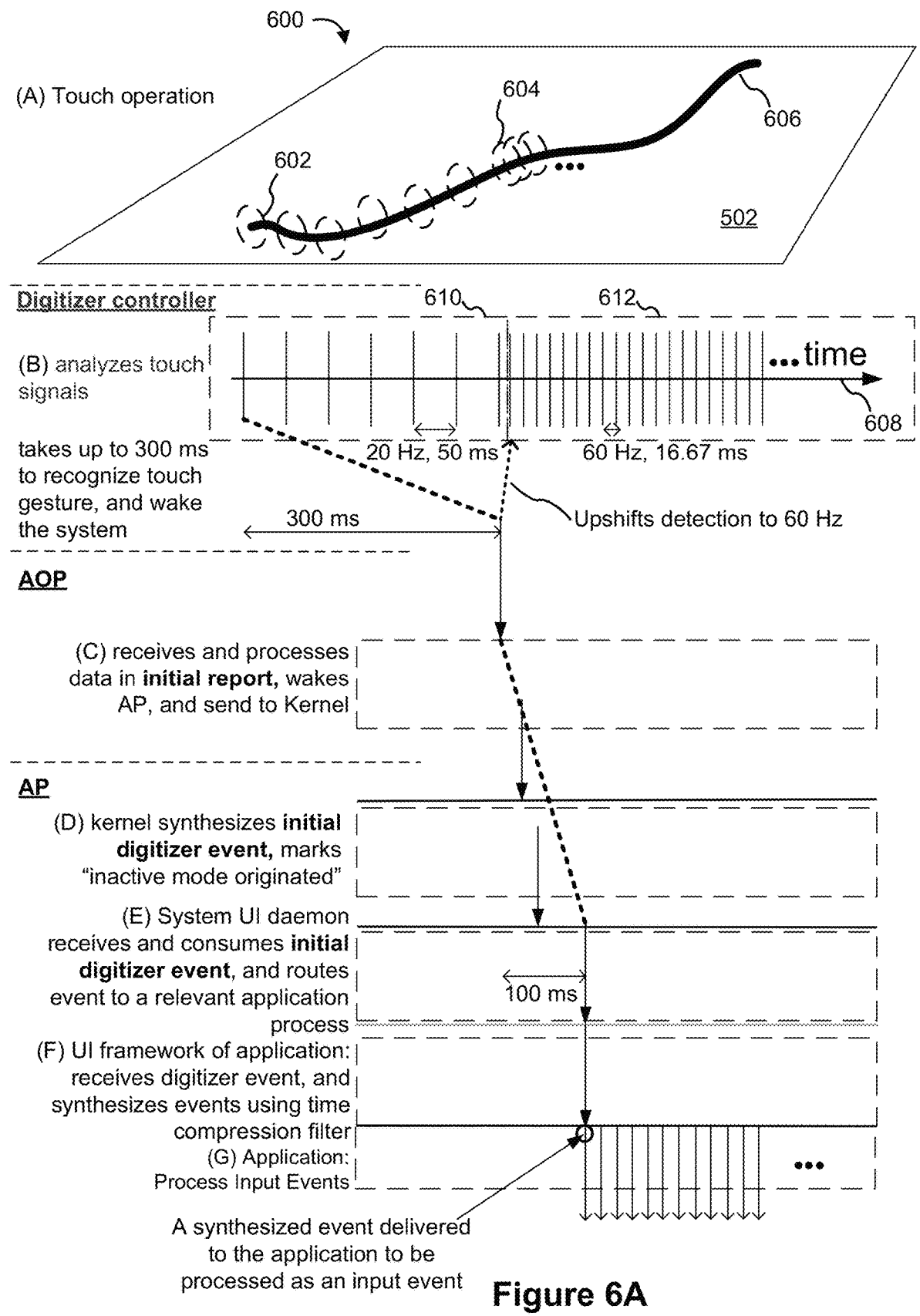
FIG. 6A shows an example timing diagram of a device that uses a time compression filter when delivering input events for a touch input initially detected while the device is in a low energy consumption mode, in accordance with some embodiments.

FIG. 6A shows an example of a timing diagram 600 for a device that incorporates the use of the time compression filter, in accordance with some embodiments. Timing diagram 600 includes a touch operation (A) on the display 502 that includes a touch-sensitive surface. The touch operation includes a contact having an initial position 602 and a second, later position 604. The touch operation traces a trajectory 606. An oval without shading is used to represent a respective contact on the touch-sensitive surface.

FIG. 6A shows various the trajectory 606 of the contact from the initial position contact 602 to the second position 604, and beyond the second position. The timing diagram 600 in FIG. 6A is a conceptual, schematic diagram, not to scale. Each position of the contact corresponds to a respective detection point, detected by the digitizer, and is analyzed by the digitizer controller 506 at the frequency associated with its current touch detection mode. While the trajectory 606 shows a continuous touch input, sampling by the digitizer controller 506 at the frequency associated with the current touch detection mode leads to the detection of the touch input at discrete detection points, illustrated by the oval contacts.

In the example shown in FIG. 6A, the digitizer controller 506 is in an inactive touch detection mode 610 having detection frequency of 20 Hz during a first portion of the touch input, corresponding positions of the contact from position 602 to position 604, and thereafter, during a second portion of the touch input, the digitizer controller 506 is in an active touch detection mode 612 having detection frequency of 60 Hz. As noted above, other detections frequencies may be used by the digitizer controller 506 in the inactive detection mode and the active detection mode; 20 Hz and 60 Hz are used here for purposes explaining operation of the time compression filter. Thus, during the first portion of the touch input, adjacent detection points produced by the digitizer controller 506 are separated by 50 ms intervals, and during the second portion of the touch input, adjacent detection points are separated by approximately 16.67 ms intervals, as represented by the vertical lines along time axis 608.

FIG. 6A shows a sequence of pipeline phases, A through F, as a touch input is processed. Phase A is the touch operation itself, and phase B is analysis of the touch input by the digitizer controller 506. As shown in FIG. 6A, in this example, the digitizer controller 506 can take up to 300 ms to recognize a touch input as a touch gesture, and it is only after recognition of the touch gesture that touch information corresponding to the detection points is provided by the digitizer controller 506 to the AOP 508, corresponding to phase C of the pipeline. Upon recognizing the touch input, the digitizer controller 506 generates an initial report that it delivers to the AOP 508. In some embodiments, the initial report includes the timestamp and position of the touch input at the moment the gesture was recognized (e.g., a position and timestamp corresponding to the second position 604 of the contact) as well as a timestamp and position corresponding to the initial detected position 602 of the contact.

The AOP 508 receives (C) the initial report from the digitizer controller 506, processes the data in the initial report, wakes the AP 510, and sends the processed data and/or the initial report to the AP kernel 518.

The kernel 518 (executed by AP 510) synthesizes (D) an initial digitizer event and marks the synthesized events as "inactive mode originated," indicating that the touch input was initially detected while the digitizer controller was in the inactive detection mode. The system UI daemon 520 (executed by AP 510) receives and consumes (E) the initial digitizer event, and routes the digitizer event to relevant application process(es).

The UI framework (e.g., the UI framework of the system shell 522 and one or more applications 514 and/or 516) receives (F) the digitizer events, and uses a time compression filter to synthesizes input events for the application. In some embodiments, up to 100 ms may have elapsed from the time the touch input was recognized (in B) to the UI framework receiving the digitizer event (in F). Further details about the time compression filter is provided in the discussion of FIG. 7A, below.

As noted above, synthesized input events for the application (e.g., the output of the time compression filter) are delivered to the application, which processes (G) the input events. In some embodiments, while delivering to the application the sequence of input events, a user interface is changed based on the touch input (e.g., moving one or more user interface elements based on a movement of the touch input, changing an appearance of one or more user interface elements based on a duration of the touch input).

Figure 6B:
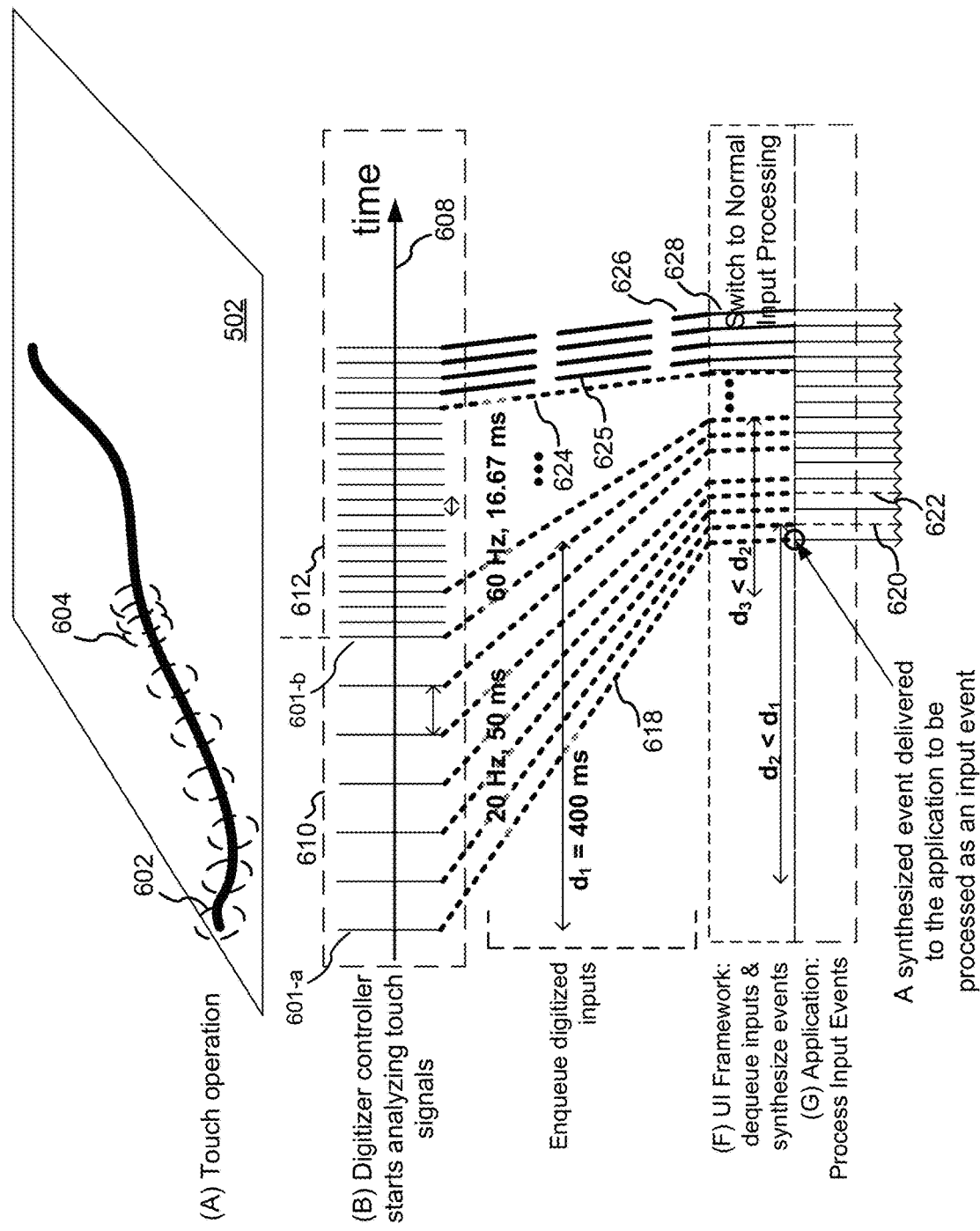
FIG. 6B shows a schematic timing diagram to illustrate a time compression or synchronization process, in accordance with some embodiments.
Figure 7A:
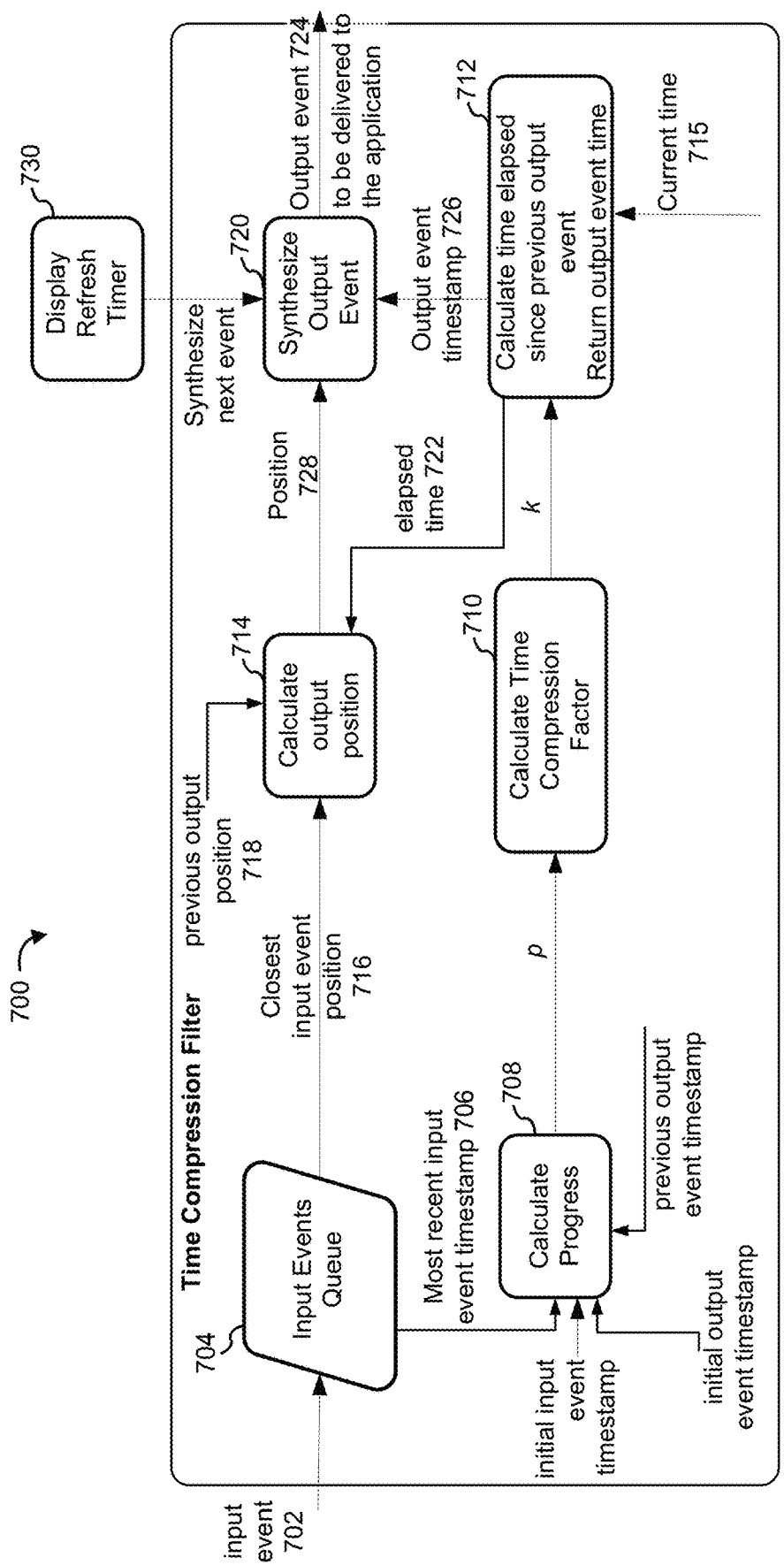
FIG. 7A shows an example process flow in a time compression filter, in accordance with some embodiments.
Figure 7B:
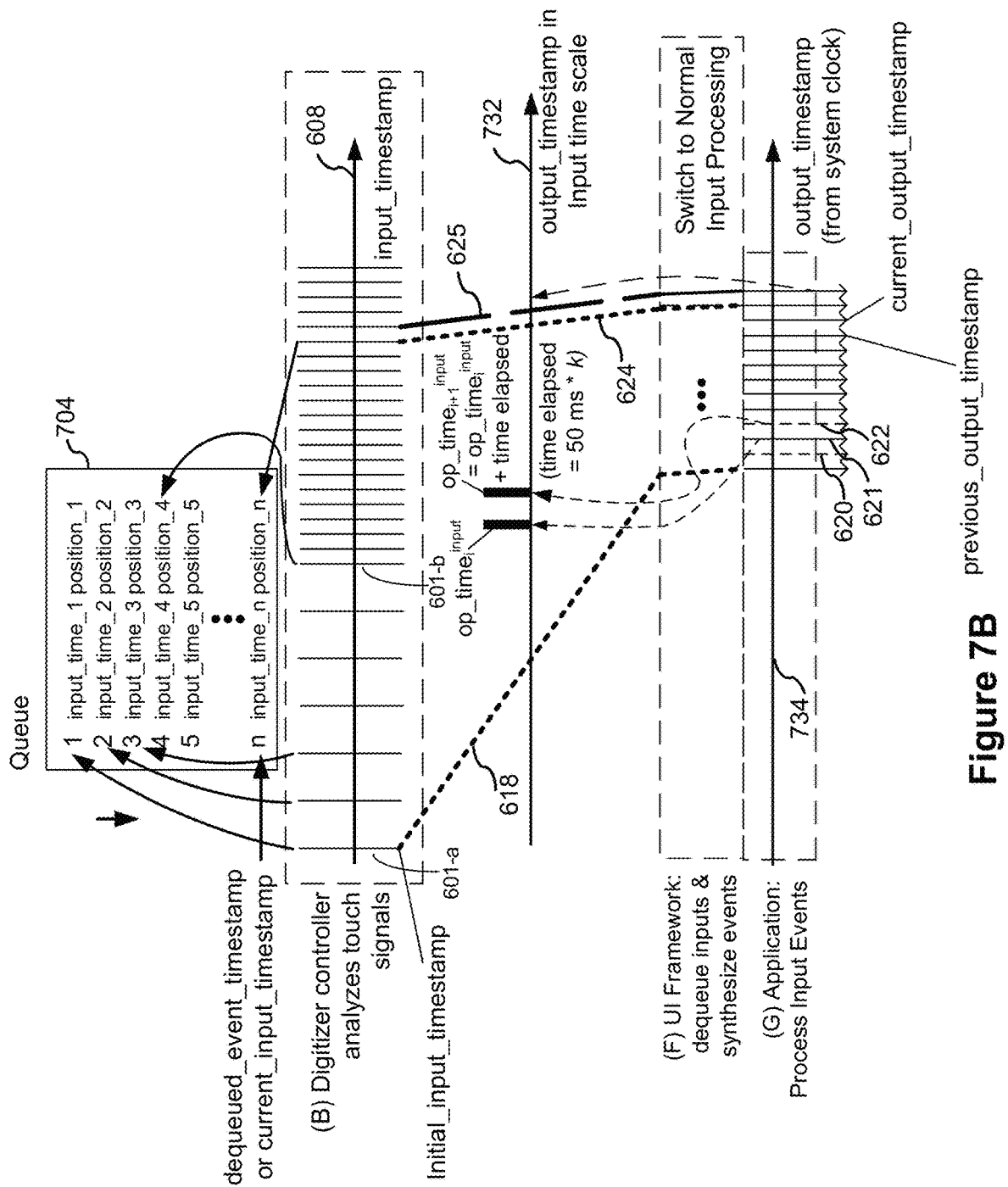
FIG. 7B depicts a simplified schematic diagram for the time compression filter, which processes information associated with a touch input to generate input events that are delivered to the application at the display refresh rate of the device, in accordance with some embodiments.

FIG. 6B shows a schematic timing diagram to illustrate the time compression or synchronization process of the time compression filter, in accordance with some embodiments. The processes associated with steps C-E shown in FIG. 6A have been summarized as "enqueue digitized inputs" in FIG. 6B. In some embodiments, each touch position of a touch gesture detected by the digitizer controller 506 is enqueued as an input event 702 in an input events queue 704 (FIGS. 7A, 7B). However, in some embodiments, upon recognition of a touch input gesture, only two touch positions (corresponding to input events 601a and 601b) are enqueued and stored in the input events queue 704 (FIGS. 7A, 7B). In particular, only the first and last touch positions, detected prior to recognition of a touch input gesture, which are also the first and last touch positions detected while the digitizer controller 506 and AOP 508 operate in the lower energy consumption mode, are enqueued as input events in the input events queue 704. After recognition of the touch input gesture, newly detected touch positions, detected at a higher sampling rate while the digitizer controller 506 and AOP 508 operate in the normal energy consumption mode, are added as input events to the input events queue 704 until synchronization is complete. During playback of the enqueued input events, described below with respect to FIGS. 7A and 7B, input events are synthesized by interpolating between the touch positions of the first two enqueued input events until the playback position passes the touch position of the second enqueued input event, corresponding to the last touch position detected prior to recognition of a touch input gesture.

A time interval $d_1$ between a first input time, corresponding to the detection time of the contact at the first position 602, and a first delivery time at which a synthesized event is delivered to the application, as shown by a double-headed arrow may be up to 400 ms in some embodiments. Dotted line 618 corresponds to the first detection of the contact at the first position and delivery of a corresponding event to the UI framework. Due to the time compression and synchronization processes in the time compression filter (described in FIG. 7A), a time interval $d_2$ between a second input time (later than the first input time), and a second delivery time, as shown by a double-headed arrow, is smaller than $d_1$. Similarly, a time interval $d_3$ between a third input time (later than the second input time), and a third delivery time, as shown by a double-headed arrow, is smaller than $d_2$. In some embodiments, the time compression filter applies a time varying compression factor such that a difference between $d_1$ and $d_2$ (e.g., $d_1-d_2$) and between $d_2$ and $d_3$ (e.g., $d_2-d_3$) is not constant (e.g., $d_1-d_2 \neq d_2-d_3$). Rather, in some embodiments, a time varying compression factor (described in FIG. 7A and FIG. 7C), which initially increases and then decreases over the course of the time compression and synchronization process, is used by the time pression filter as it processes the enqueued digitized inputs.

A first newly synthesized event 620 is generated between the first delivery time and the second delivery time. A second newly synthesized event 622 is generated between the second delivery time and the third delivery time. The first and second newly synthesized events 620 and 622 are each synthesized by the time compression filter from two or more of the enqueued digitized inputs, and therefore do not have a counterpart in the touch operation. Rather, in step G, the application receives input events generated by the time compression filter at the display refresh rate. Due to differences in the frequency of the inactive mode detection (e.g., at a lower frequency of about 20 Hz) and the display refresh rate (e.g., at a higher frequency (e.g., a frequency between 40 Hz and 120 Hz, such as 60 Hz), the time compression filter creates new events that do not have a direct counterpart in the input data analyzed by the digitizer controller 502 in the inactive detection mode. Delivering synthesized events at the same rate as the display refresh rate to the application to be processed as input events helps to improve the user perceived responsiveness of the device 500 (every frame of display that is provided to the user at the refresh rate includes a portion of the detected (or interpolated) touch operation.

A dot-dashed connecting line 624 corresponds to a last touch input that is processed by the time compression filter, at which point synchronization is achieved, and line 625 corresponds to a first input detected and analyzed by the digitizer controller 506 after the time compression filter has fully synchronized the touch input with the events delivered to the application. As a result, connection line 654 corresponds to a first input event that is handled by normal input processing, and is delivered to the application (in step G) without being processed by the time compression filter. FIG. 6B shows three subsequent connecting lines, the last two of which are labelled 626 and 628, in which the UI framework of the application dependent software component (e.g., 514 and/or 516) in the AP 512 has switched back to normal input processing. In normal input processing, normal event delivery to the application is no longer halted, and the time compression filter is no longer used (e.g., input events are no longer replayed at a faster rate than they are received). In some embodiments, during normal input processing, events are delivered to the application to be processed at the same frequency as those events are being detected and analyzed by the digitizer controller 506.

FIG. 7A shows an example of a process flow in a time compression filter 700 in accordance with some embodiments. In some embodiments, the time compression filter 700 is implemented as part of contact/motion module 130 (FIG. 1A), or touch processing module 220 of contact/motion module 130 (FIG. 1B). The time compression filter 700 is sometimes called an event synchronization or time synchronization filter. A purpose of the time compression filter is to synchronize detected touch events (e.g., including those that are in a queue awaiting processing) until normal delivery of touch events resumes, at which point touch events are delivered in near real-time (e.g., subject to intrinsic latency associated with processes on the device 500) to the relevant application or applications. To simplify the description of FIG. 7A, signals directed into the time compression filter are referred to as "input events" 702, while signals generated by the time compression filter 700 and delivered external to the time compression filter 700 are referred to as "output events" 720. However, output events 720 to be delivered to the application are considered by the application to be input events, and are labeled "input events" in FIGS. 6A, 6B and 7A.

The time compression filter 700 receives an input event 702, passed to the time compression filter from the UI framework of the application specific software component. The UI framework directs the input event 702 to the time compression filter 700 for input events that are marked "inactive mode originated." The input event 702 includes a timestamp and a position associated with the touch input detected by the digitizer 502. The input event 702 is stored in an input events queue 704. As shown in FIG. 7B, the input events queue 704 stores a sequence of touch inputs, each touch input having a timestamp and position. As noted above, in some embodiments, the inputs events queue 704 stores an input event for each touch position detected during a recognized touch gesture, until synchronization is complete. But in some other embodiments, while at least a portion of the device 500 is in a lower energy consumption mode, only the first and last detected positions of the touch gesture are enqueued as input events. Furthermore, in some embodiments, after the portion of device 500 transitions to a normal energy consumption mode, and while the touch gesture continues to be detected, detected positions of the touch input after recognition of the touch gesture are enqueued as input events until synchronization is complete. The description here of the operation of the time compression filter 700 is equally applicable, regardless of whether all or just two of the detected touch positions are stored as input events in the input events queue 704.

A display refresh timer 730 generates a timing signal that fires at the refresh rate of the display 502 of the device 500. In some embodiments, the display refresh timer 730 is activated, or receipt of the timing signals from the display refresh time 730 at the time compression filter 700 is enabled, when the time compression filter receives a second input event (e.g., the input events queue 704 already includes at least one entry when the input event 702 is received by the time compression filter), or equivalently, when the input events queue 704 stores two or more input events. In some embodiments, the display refresh timer 730 remains activated, or receipt of the timing signals from the display refresh time 730 at the time compression filter 700 remains enabled, until synchronization is complete, e.g., when all input events in the queue have been processed by the time compression filter.

The time compression filter 700 includes a timer loop. Each computational iteration of the timer loop produces one output event 724. The timer loop includes the following components:

A progress calculator 708 calculates the progress of the synchronization process, using the initial input timestamp (e.g., input_time_1 or ip_time$_1^{input}$), the initial output event timestamp (e.g., the output event timestamp for a first output event produced by the filter, represented in the input time scale), the last processed output event timestamp for the last output event produced by the filter (if any), represented in the input time scale, and the timestamp of the more recent input event to be processed by the time compression filter, as retrieved from the input events queue 704. Since the number of inputs events in the input events queue 704 that are processed to produce each output event 724 is variable, there is no one-to-one correspondence between input events and output events.

In the example below, when producing output event i+1, a progress p is determined for the synchronization process using information associated with the previous ($i^{th}$) output event, and a time compression factor k is determined, by time compression factor calculator 710, based on the program p. For example, for output event i+1, the progress calculator computes the progress p:

$$p = \frac{\text{op\_time}_i^{input} - \text{op\_time}_1^{input}}{\text{ip\_time}_c^{input} - \text{ip\_time}_1^{input}}$$

where op_time$_i^{input}$ corresponds to the output time of the current (e.g., last processed) input, measured in input time scale, op_time$_1^{input}$ corresponds to the output time of the initial (e.g., first processed) input, measured in input time scale, ip_time$_c^{input}$ corresponds to the time stamp of the current (e.g., last processed) input, and ip_time$_1^{input}$ corresponds to the input time of the initial (e.g., first processed) input. The value of p is 0.0, when the initial (e.g., first) output event is computed. The value of p is 1.0 when the total elapsed output time, measured in input time scale, matches the total elapsed input time, between the first and last input events, at which point synchronization is achieved, time compression filtering ends, and normal delivery of touch input events resumes. However, in some embodiments, synchronization is achieved, time compression filtering ends, and normal delivery of touch events resumes, when all the input events in the queue 704 have been processed, or the position of the most recent output event matches the position of the most recent input event, either of which can occur before the value of progress p reaches 1.0.

A time compression factor calculator 710 computes a time compression factor based on the progress p computed by the progress calculator 708. In some embodiments, the compression factor k has a range of values, from a lowest or minimum value, k_min, (e.g., k_min is 1.02, or a value between 1.01 and 1.10) to a maximum value, k_max (e.g., 1.9, or a value between 1.8 and 2.5). In some embodiments, the progress p at which the maximum time compression factor is used is denoted z, and z is about 0.4 (e.g., z equals 0.4, or a value between 0.3 and 0.7).

In some embodiments, the compression factor is calculated using a polynomial function f(p), such as:

For $p < z, f(p) = 1 - (1-p)^4$

For $p >= z, f(p) = 1 - (p)^4$

In some embodiments, the return value of the polynomial function f(p) is multiplied by a first scaling factor and an offset is added to that in order to produce values ranging between k_min and k_max for all values of p. Stated another way, the value of f(p) is used to interpolate between k_min and k_max. Many other functions, including polynomial and piecewise linear functions can be used to map progress p to a compression factor k.

In some embodiments, k_min, k_max and z are hard coded into the time compression filter (e.g., set as fixed values in the AP 510, the values do not vary during operation of the device 500). In some embodiments, k_min, k_max, and z are set at runtime based on, for example, the type of detected gesture or the size of the latency. Any smoothly varying function that monotonically increases from p=0.0 to z, and then monotonically decreases from z to p=1.0 can be used in the time compression factor calculator 710. In some embodiments, the time compression factor calculator 710 switches between different monotonically increasing and decreasing functions in runtime, depending on the context, to accommodate various user experience X preferences.

A time calculator 712 receives a current time 715, e.g., from a system clock of the device 500. When triggered by display refresh timer 730, a current output timestamp is generated by on the current time 715. The time calculator 712 also calculates the time elapsed in the input time scale since the last (e.g., immediately preceding) output event:

Time elapsed in the input time scale=(current output timestamp−previous output timestamp)*compression factor.

This value is sometimes herein called the elapsed time. In some embodiments, the difference between the current and previous output times is a fixed value, such as 16.67 ms, and the elapsed time is that fixed value multiplied by the time compression factor, k. Since the compression factor varies in value as the progress p changes in value, the elapsed time, in the input time scale, between sequential (e.g., neighboring) output events also varies.

Based on the time elapsed in the input time scale, the output event timestamp, in the input time scale, for the next (i+1) output event is the output event timestamp for the previous ($i^{th}$) output event, plus the elapsed time, in the input time scale:

op_time$_{i+1}^{input}$=op_input$_i^{input}$+time elapsed in input time scale.

In some embodiments, the output events 724 delivered to the application have timestamps in the system clock time scale, and thus sequential (e.g., successive or neighboring) output events 724 have timestamps that differ by the amount of time between sequential (e.g., successive or neighboring) display refresh times.

The current output position associated with the current output timestamp is calculated by an output position calculator 714. The output position calculator 714 dequeues input events from the queue 704 until it finds a respective input event with a timestamp equal to or later than the output event timestamp, in the input time scale, for the next (i+1) output event. If such an input event is found in the queue 704, the output position for the next output event is determined by interpolating (e.g., linearly interpolating, or using other interpolation methods) between the last output position, the previous ($i^{th}$) output event, and the position in the respective input event, based on the output event time, in the input time scale. The next (i+1) output event 724 is synthesized using the determined output position. It is noted that, in some embodiments (e.g., embodiments in which only two input events 702 are enqueued in queue 704 during the initial portion of a touch gesture, detected while at least a portion of the device is operating in a low power consumption mode), several successive output events 724 may be synthesized using the same respective input event dequeued from the queue 704, for a sequence of output event times, in the input time scale.

If there are not enough input events in the queue 704, the position (e.g., x, y) for the next output event is synthesized, by output event synthesizer 720, using the position (e.g., x, y) of the last input event in the queue 704, and the output event 724 is delivered to the application. In this event, synchronization is completed when the output event 724 is synthesized (e.g., generated or produced). Otherwise, synchronization is achieved, time compression filtering ends, and normal delivery of touch input events resumes when any of the conditions discussed above are achieved or detected.

If synchronization has not yet been achieved, in which case there are more events in the queue 704, the timer loop waits for the next timer iteration (at the display refresh rate) from the display refresh timer 730 to execute a next iteration of the timer loop.

In some embodiments, instead of using interpolation in the output position calculator 714 to determine an output position, a shortest path from the most recent output position (728) towards the most recent input position (716) is used, to determine the next output position. The use of the shortest path does not preserve the original path of the touch inputs. In some embodiments, instead of using the time compression filter, a shortest path algorithm calculates the next output position from the most recent output position towards the most recent input position. The original path of the touch inputs may not be preserved in such embodiments.

In some embodiments, velocity samples are collected for each input event, and an acceleration factor is determined for each successive event to be delivered to the application, to boost the originally recorded velocity associated with each input event and thereby gradually reduce the latency from input detection to input event delivery to the application(s), and then resume normal delivery of touch events to the application(s).

In some embodiments, the original touch input stream (e.g., data represented times and positions at which the touch input is detected) is resampled to a rate high enough to accommodate time compression, before time compression is performed on the resampled input stream.

FIG. 7B depicts a simplified schematic diagram showing how the time compression filter processes time information associated with a detected touch to generate input events that are delivered to the application at the display refresh rate of the device, in accordance with some embodiments.

As described in reference to FIG. 7A, in accordance with a determination that the input events queue 704 (or the time compression filter) has received a second input event (e.g., an event having input_time_2 and position_2), the display refresh timer 730 is activated. A sequence of input events that are delivered the application at step G are generated at the same display refresh rate as the display refresh timer 730 (e.g., 60 Hz, or any of the display refresh rates discussed above). Optionally, a timestamp for each of these input events is generated based on the system clock of the device, and is referred to as "output timestamp" shown on time axis 734. The output timestamp associated with each of these input events is converted to a time axis 732 which recalibrates the output timestamp in input time scale. For example, as a result of time compression, 16.67 milliseconds elapsed on the system clock corresponds to a larger amount of time, such as 20 milliseconds in the input time scale (e.g., the path of the touch gesture, represented by input events stored in the input event queue 704, is replayed at faster rate compared to the system clock).

While not drawn to scale, FIG. 7B shows that for two sequential (synthesized) input events, i and i+1, (e.g., events 621 and 622 in FIG. 7B) the corresponding output timestamps, in input time scale, are further separated in time (as shown on time line 732) than the corresponding output timestamps in the system clock time scale (on time line 734).

As discussed in more detail above, based on the time compression factor, an amount of elapsed time in input time scale is calculated, and added to the previous output time stamp in input time scale. The result is the current output timestamp in input time scale. As described with reference to FIG. 7A, a progress p of the synchronization process is calculated based on the current output timestamp in input time scale. The progress p is then used to determine a new time compression factor.

Once synchronization has been achieved (e.g., for events after the event 624 at which synchronization is achieved), the time compression filter is no longer used to synchronize later events, and as a result, no further calculations of the time compression factor and time elapsed are needed or performed, which in FIG. 7B is indicated by "Switch to Normal Input Processing" for the UI framework.

Figure 7C:
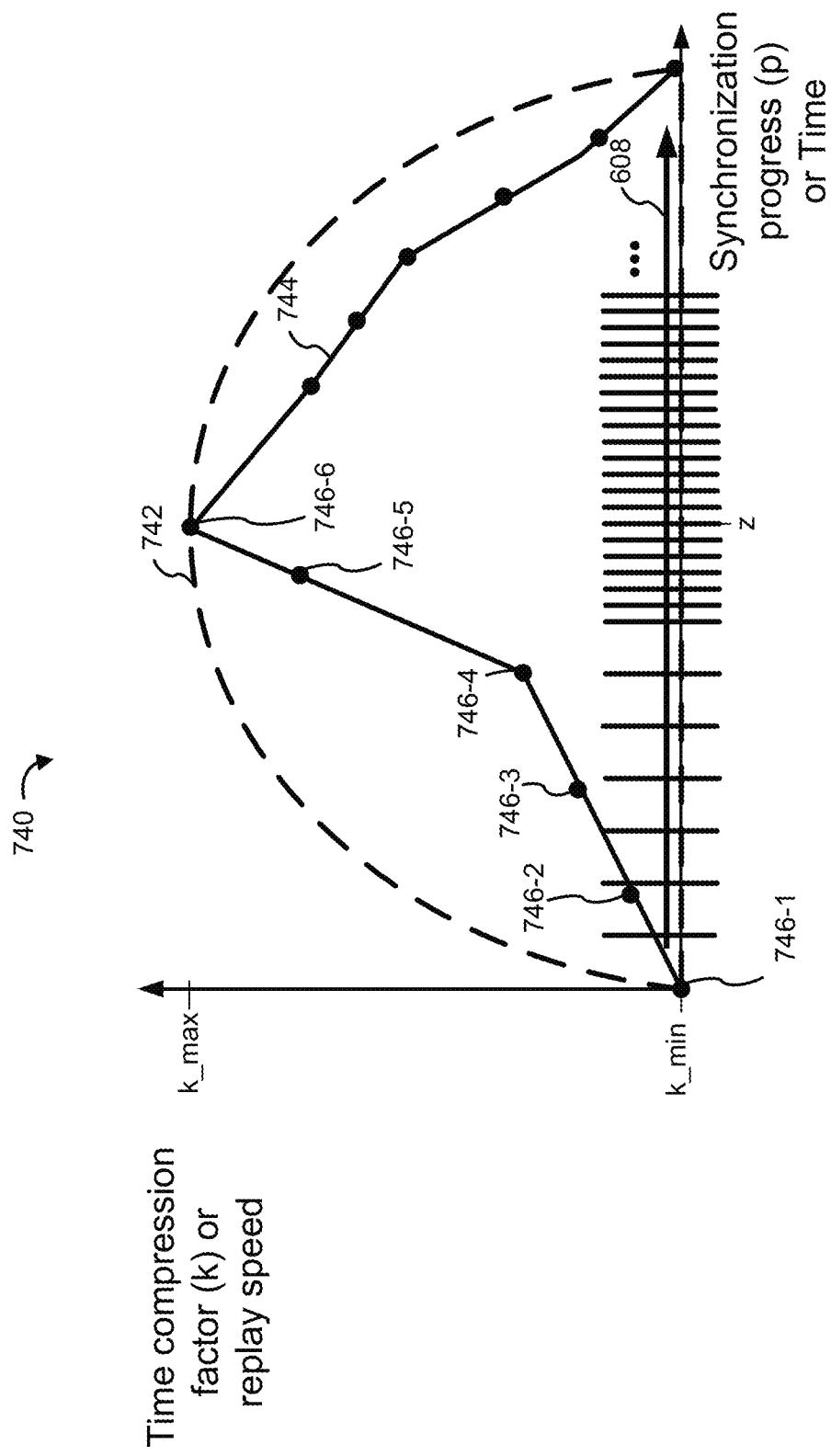
FIG. 7C shows two examples of functions used to calculate a time compression factor used by the time compression filter while generating input events from a touch input, in accordance with some embodiments.

FIG. 7C shows two examples of time compression functions used to calculate a time compression factor, in accordance with some embodiments. As shown in graph 740, one example of a time compression function is a polynomial (e.g., quadratic or higher order) function 742 used to map a current value of synchronization progress p to a time compression factor k. Polynomial function 742 varies smoothly as a function of the synchronization progress p, for example as p progresses from a value of 0 to a value of 1.

As shown in graph 740, a second example of a time compression function is a piecewise linear function 744, having a series of linear portions, used to map a current value of the synchronization progress p to a time compression factor k. In some embodiments, junctions (e.g., points 746-1, 746-2, 746-3, 746-4, 746-5, 746-6) between the linear portions of the piecewise linear function 744 are hardcoded, each having (or corresponding to) a specified synchronization progress value and time compression factor value.

In some embodiments, the time compression function 742 or 744 returns a maximum time compression factor k_max, when the synchronization progress p is at a value z. In some embodiments, k_max is a value between 1.5 and 2.5, one example of which is 1.9. In some embodiments, the minimum value of the time compression factor k is a predefined minimum value k_min, such as a value between 1.0 and 1.2, one example of which is 1.02. In some embodiments, k_max is 1.9, k_min is 1.02 and z is 0.4. In some embodiments, the values of k_max, k_min, and z are hardcoded. In some embodiments, the values of k_max, k_min, and z are determined at run time.

In some embodiments, different time compression functions may be used in different contexts, or different circumstances; optionally, the time compression function to be is determined at run time, e.g., while processing a touch input.

Figure 7D:
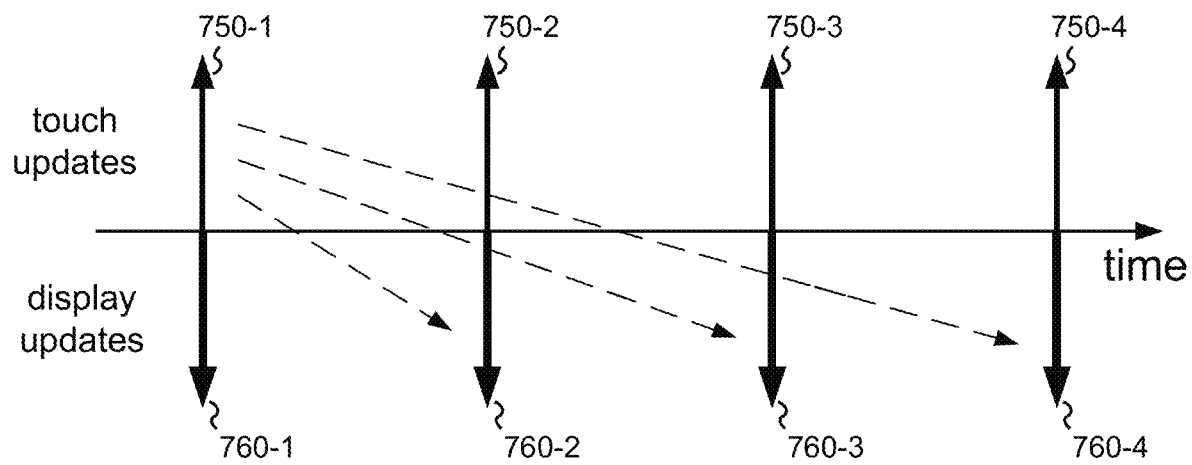
FIGS. 7D-7E illustrate exemplary timing diagrams for detecting a touch input at a sequence of times and delivering corresponding input events to an application, in accordance with some embodiments.
Figure 7E:
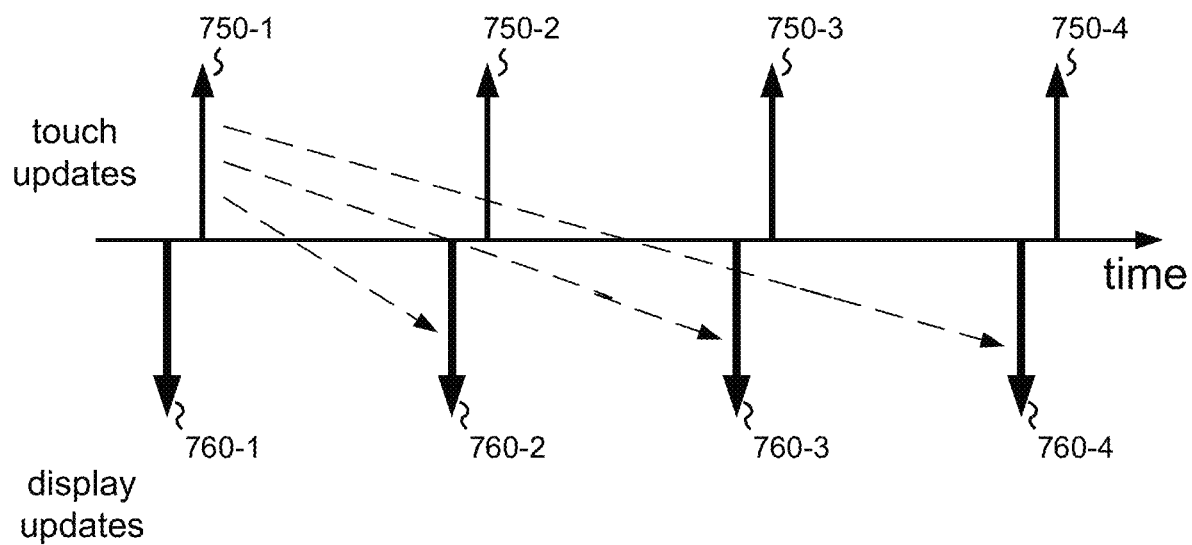
Figure 8A:
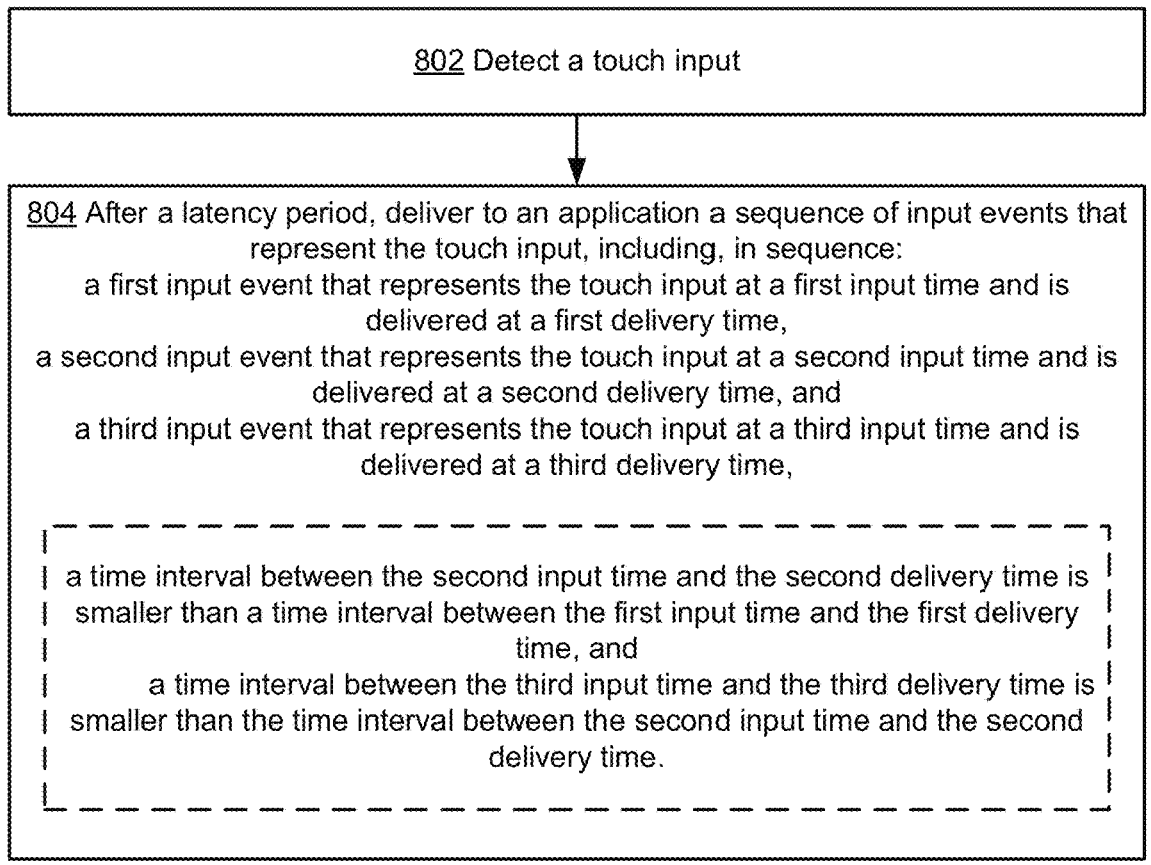

FIGS. 7D-7E are timing diagrams that show timing of receiving (e.g., detecting) touch inputs (or changes to touch inputs) and timing of displaying (or updating) user interfaces, in accordance with some embodiments. In FIGS.

7D-7E, upward arrows 750 represent timing of touch inputs (or changes to touch inputs) and downward arrows 760 represent timing of displaying (or updating) user interfaces. FIGS. 7D-7E are not drawn to scale.

In some embodiments, as represented by FIG. 7D, touch inputs are received at a sequence of times 750-1, 750-2, 750-3, and 750-4 and a user interface is updated at a sequence of times 760-1, 760-2, 760-3, and 760-4. In FIG. 7D, the detection rate and the display rate are the same (e.g., both the detection rate and the display rate are 60 Hz). In FIG. 7D, touch input detection and display updates are synchronized (e.g., there is no phase difference, which in some embodiments is defined as having a phase difference of 1 ms or less). For example, the touch input received at 750-1 is concurrent (e.g., having a phase difference of 1 ms or less) with an update to the user interface at 760-1. Similarly, the touch input received at 750-2 is concurrent with an update to the user interface at 760-2.

FIG. 7D also illustrates that the touch input received at 750-1 is processed and used to produce a user interface after one display frame, two display frames or three display frames, corresponding to latencies of one, two and three display frames. In some embodiments, normal touch input processing has a latency between 0.5 and 2.5 display frames, or one or two display frames in systems in which touch input detection and display update are concurrent (e.g. within 1 ms of each other), while touch input processing using the time compression filter has an initial latency that is much larger, such as 24 display frames (e.g., approximately 400 ms) or more generally between 18 and 30 display frames (e.g., approximately 0.3 to 0.5 seconds), and a final latency equal to the normal touch input processing latency (e.g., one or two display frames, which at 60 Hz would be approximately 16.67 ms or 33.33 ms). In some embodiments, while touch input processing using the time compression filter, each successive event delivery during the synchronization process has progressively smaller latencies. In some embodiments, the number of input events delivered during the synchronization process is between 6 and 18, or between 9 and 12.

In some embodiments, touch input detection and display updates occur at the same rate (e.g., 60 Hz), but are offset in time, as shown in FIG. 7E. Said another way, there is phase difference between detection timing and display timing. The range of latencies from touch input to display update are similar to that described above with reference to FIG. 7D, except that the minimum latency during normal input processing, from touch input to display update, may depend on the timing offset between touch input detection and display updates, and similarly the maximum latency during time compression filtering, from touch input to display update, may also depend on the timing offset between touch input detection and display updates.

FIG. 7E also illustrates that the touch input received at 750-1 is processed and used to produce a user interface in a next display frame (e.g., a time 760-2), in a display frame subsequent to the next display frame (e.g., a time 760-3), or in two display frames subsequent to the next display frame (e.g., a time 760-4). In some embodiments, or in some circumstances, the touch input received at 750-1 is processed and used to produce a user interface in a display frame produced subsequent to time 760-4.

FIGS. 8A-8D illustrate a flow diagram of method 800 of delivering touch inputs to an application in accordance with some embodiments. Method 800 is performed at an electronic device (e.g., device 300, FIG. 3, or portable multi-function device 100, FIG. 1A, or device 500, FIG. 5A) with a display and a touch-sensitive surface. In some embodiments, the electronic device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides a way to deliver touch inputs to an application when a portion of the touch inputs are received or detected when the device is in a lower energy consumption state. The method helps to smoothly transition from processing enqueued touch events detected while the device is in a lower energy consumption state to normal event delivery (e.g., real-time event delivery), smoothly reducing the amount of touch input to display update latency from an initial latency to a normal, much lower latency. Method 800 allows a device, such as device 500, to enter a lower energy consumption mode while reducing discrepancies between detected touch inputs and displayed user interfaces, thereby reducing the cognitive burden on a user when interacting with a touch screen. In addition, this creates a more efficient human-machine interface. For battery-operated electronic devices, enabling a user to interact with the user interface even while the device is in a lower energy consumption state helps to reduce errors and unnecessary corrections, thereby conserving power and increasing the time between battery charges.

The device detects (802) a touch input. For example, as discussed with reference to FIGS. 6A and 6B, the touch input is detected at a first sequence of times including, in sequence, a first input time, a second input time, and a third input time.

After a latency period, (e.g., which optionally corresponds to a time during which input events are not being passed to applications of the device), the device delivers (804) to an application a sequence of input events that represent the touch input, including, in sequence: a first input event that represents the touch input at a first input time and is delivered at a first delivery time, a second input event that represents the touch input at a second input time and is delivered at a second delivery time, and a third input event that represents the touch input at a third input time and is delivered at a third delivery time. For example, FIGS. 6A, 6B, and 7B, show examples of touch input times and delivery times. A time interval between the second input time and the second delivery time is smaller than a time interval between the first input time and the first delivery time, and a time interval between the third input time and the third delivery time is smaller than the time interval between the second input time and the second delivery time. For example, in FIG. 6A, the three time intervals correspond to $d_1$, $d_2$, and $d_3$, and $d_3 < d_2 < d_1$. Each of the aforementioned time intervals is a latency, e.g., a delivery latency, between touch input detection and delivery of corresponding touch information (e.g., a touch event) to an application.

Delivering a first input event, second input event, and a third input events such that a time interval between the second input time and the second delivery time is smaller than a time interval between the first input time and the first delivery time provides improved visual feedback to a user (e.g., displaying changes to the user interface based on touch inputs received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, after predefined synchronization criteria are satisfied, while the touch input continues to be detected, touch events continue to be delivered to the application, with each touch event having the same delivery latency, comprising the difference between delivery time and input time, as the other touch events delivered after the predefined synchronization criteria are satisfied.

In some embodiments, each input event comprises a touch event that includes a plurality of fields having values describing features of the touch event, such fields having a timestamp and a location for the touch event, e.g., as shown in FIG. 1C. For an input that is a long press gesture, a respective input event optionally includes a gesture type value (e.g., indicating that the gesture is a long press), a location (e.g., indicating a centroid of the touch input), a duration (e.g., the duration of the touch input, so far), and/or a value indicating whether the current input event is the first input event, or a later input event, of the long press. Similarly, for a drag or swipe gesture, a respective input event optionally includes a gesture type value (e.g., indicating that the gesture is a drag or swipe input), a location (e.g., indicating a centroid of the current position of the touch input), an amount of movement since the last input event, and/or a value indicating whether the current input event is the first input event, or a later input event, of the drag/swipe gesture.

In some embodiments, the touch input for which method 800 is performed has a duration greater than a predefined threshold (806). For example, in some embodiments, the predefined time threshold is greater than or equal to the maximum duration of a tap gesture. Tap gesture processing is discussed above with respect to FIG. 5B. Providing specialized processing (e.g., time compression filtering) of a touch input having a duration greater than a predefined threshold provides improved visual feedback to a user (e.g., displaying changes to the user interface based on touch inputs, that are longer than tap gestures, received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, or in some circumstances, the touch input for which method 800 is performed includes (808) movement of the touch input greater than a predefined movement threshold. A touch input with movement is illustrated in FIG. 6A. Examples of touch inputs that include movement are drag inputs, touch inputs, and pinch or depinch inputs. It is noted that the processing of method 800 is, optionally, not needed for touch inputs that do not include movement greater than the predefined movement threshold, since the touch input can be modeled as a stationary touch input, which does not require time compression filtering to provide a smooth transition from processing enqueued touch events detected while the device is in a lower energy consumption state to normal event delivery.

Providing specialized processing of a touch input that includes movement of the touch input greater than a predefined movement threshold provides improved visual feedback to a user (e.g., displaying changes to the user interface based on an extended touch input (e.g., a swipe), a portion of which may be received while the device is in a lower energy consumption state), while avoiding performing such specialized processing for substantially stationary touch inputs. Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, delivering (804) to the application the sequence of inputs includes delivering (810) to the application a sequence of input events that replays the touch input at a rate that varies over time. In some embodiments, while replaying the detected touch input, input events in the sequence of input events are generated using a time-varying time-compression factor for mapping values of the touch input at a first sequence of times to the input events in the sequence of input events at a second sequence of times until predefined synchronization criteria, with respect to detection of the touch input and delivery of the input events, are satisfied. In some embodiments, the second sequence of times occur at predefined, fixed time intervals corresponding to a frame rate (sometimes called a display update rate or display rate) for updating a user interface of the application, and prior to the predefined synchronization criteria being satisfied, the fixed time intervals between neighboring delivery times in the second sequence of times correspond to variable-length time intervals with respect to the touch input. From another perspective, while replaying the detected touch input, a rate at which the detected touch input is replayed and delivered to the application changes over time until the predefined synchronization criteria, with respect to detection of the touch input and delivery of the sequence of input events, is satisfied. This is illustrated in FIGS. 6A, 6B and 7B, which show a touch input being replayed at a rate that varies over time.

Replaying a touch input at a rate that varies over time provides improved visual feedback to a user (e.g., displaying changes to the user interface based on touch inputs received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the rate at which the touch input is replayed increases over time while at least a first portion of the touch input is replayed (812). For example, while initially replaying the detected touch input, a time-compression factor used to generate touch events from the touch input increases from an initial value, such as 1.02, to a peak value, such as 1.4 or 1.9. This is illustrated in FIGS. 6A and 7C, for example. Increasing over time the rate at which the touch input is replayed while at least a first portion of the touch input is replayed provides improved visual feedback to a user (e.g., displaying changes to the user interface based on touch inputs received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the rate at which the touch input is replayed decreases over time while at least a second portion of the touch input is replayed (814). In some embodiments, the time-compression factor decreases over time while at least a second portion of the detected touch input is replayed. For example, while replaying the second portion of the detected touch input, the time-compression factor decreases from a peak value, such as 1.4 or 1.9, to a minimum value, such as 1.02. This is illustrated in FIGS. 6A and 7C, for example. Decreasing over time the rate at which the touch input is replayed while at least a second portion of the touch input is replayed provides improved visual feedback to a user (e.g., displaying changes to the user interface based on touch inputs received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, a respective input event delivered to the application after the first input time and before the third delivery time (e.g., at which time the predefined synchronization criteria have been satisfied) represents (816) a portion of the touch input having a duration determined based on a difference between a most recent input time (e.g., an input time that corresponds to a current time or an input time that corresponds to an end of the input) and an input time represented by an input event delivered to the application immediately preceding delivery of the respective input event. In some embodiments, the process or step of determining the portion of the touch input represented by a respective input event is repeated multiple times, for a sequence of multiple input events. In some embodiments, the speed of replay Having a portion of the touch input in which a duration is determined based on a difference between a most recent input time and an input time represented by an input event delivered to the application immediately preceding delivery of the respective input event provides improved visual feedback to a user (e.g., displaying changes to the user interface based on touch inputs received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, while delivering to the application the sequence of input events, the device changes (818) a displayed user interface based on the touch input. More specifically, in some embodiments, changing the user interface includes moving one or more user interface elements based on a movement of the touch input (820). In some embodiments, changing the user interface includes changing an appearance of one or more user interface elements based on a duration of the touch input (822).

Changing a user interface, for example by moving one or more user interface elements based on a movement of the touch input, or by changing an appearance of one or more user interface elements based on a duration of the touch input, provides improved visual feedback to a user (e.g., displaying changes to the user interface based on touch inputs received while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the first delivery time is prior to the third input time such that the touch input continues to be detected after the first input event in the sequence of input events is delivered to the application (824). Thus, the touch input continues to be detected after the first delivery time. In one example, the third input time corresponds to the earliest input time, in the first sequence of times, for which the predefined synchronization criteria are satisfied, but in other examples the third input corresponds to a portion of the touch input which is processed prior to the predefined synchronization criteria being satisfied, or the third input corresponds to a portion of the touch input which is processed after the predefined synchronization criteria are satisfied. Examples of touch input times before and after the first delivery time are illustrated in FIGS. 6A, 7A, and 7C. Achieving synchronization prior to the end of the touch input, as exemplified by continuing to detect the touch input after the first input event in the sequence of input events is delivered to the application, provides improved visual feedback to a user (e.g., smoothly transitioning from deferred delivery to normal delivery of touch events to an application for touch inputs first detected while the device is in a lower energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the method is performed at an electronic device, at least a portion of the electronic device (e.g., one or more processors, such as a display and touch input control processor, of the electronic device) having a first state (e.g., a lower power consumption state) and a second state (e.g., a normal, higher power consumption state), wherein in the first state the electronic device consumes less power than in the second state and in the second state the electronic device responds to inputs with a lower latency than in the first state, and the method includes detecting the touch input at the first input time while the portion of the electronic device is in the first state (826). In some embodiments, or in some circumstances, at the first delivery time, the portion of the electronic device is in the second state (e.g., the normal, higher power consumption state). This is illustrated in FIG. 6A, for example, in which a transition from an initial sampling rate to a normal, higher sampling rate, for sampling the touch input, occurs prior to the first delivery time. Performing the method on a device having the first state and the second state enhances the operability of the device, by reducing power usage while in the lower energy consumption state, improving battery life, and allowing the user to provide inputs even when the device is in a lower energy consumption state, which, additionally, enables the user to use the device more quickly and efficiently (e.g., delivering touch events to the application based on touch inputs received while the device is in a lower energy consumption state).

In some embodiments, the device enters (828) the second state in response to detecting the touch input at the first input time. For example, as shown in FIG. 6A, receipt of the touch input at the first time triggers processing and recognition of the touch input by the digitizer controller 506, and when the touch input is recognized, the digitizer controller 506 transitions to the second state, in part by upshifting to a higher touch input detection rate (e.g., from 20 Hz to 60 Hz), and delivering an initial report regarding the touch input to the AOP 508. Thus, at least the digitizer 506 transitions from the first state, corresponding to mode 610 in FIG. 6A, to the second state, corresponding to mode 612 in FIG. 6A. Furthermore, as described above, the initial report to the AOP 508 causes the AOP 508 to report the touch input to the AP 510, which in turn causes the AP 510, or portions of the AP 510, to transition from the first state to the second state. Entering the second state in response to detecting the touch input at the first input time provides improved visual feedback to a user (e.g., detecting the touch input at a higher detection rate by transitioning from a lower energy consumption state to a higher energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the device detects (830) the touch input at the third input time while the portion of the electronic device is in the second state. For example, in FIG. 6B, the third time difference, $d_3$, corresponds to an input time after the electronic device has transitioned to the second state and is sampling the touch input at 60 Hz instead of 20 Hz. Detecting the touch input at the third input time while the portion of the electronic device is in the second state provides improved visual feedback to a user (e.g., detecting the touch input at a higher detection rate by transitioning from a lower energy consumption state to a higher energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the device delivers (832) to the application a first input event in the sequence of input events at the first delivery time while the portion of the electronic device is in the second state. In the example illustrated in FIGS. 6A and 6B, the digitizer controller transitions from mode 610 to mode 612 prior to the first delivery time. Delivering to the application a first input event in the sequence of input events at the first delivery time while the portion of the electronic device is in the second state provides improved visual feedback to a user (e.g., delivering the first input event initially detected in a lower energy consumption state after transitioning from the lower energy consumption state to a higher energy consumption state). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the device detects (834) a second touch input, and in accordance with a determination that the second touch input is a predefined second type of input, delivers to the application a single input event corresponding to the second touch input. For example, as illustrated in FIG. 5B, if the second touch input is a tap input (560—Yes), the digitizer event representing the touch input is passed through to the UI framework, which in turn passes it to the application. Delivering to the application a single input event corresponding to the second touch input provides improved visual feedback to a user, by simplifying the processing and speeding delivery of touch inputs that do not require time compression filtering. Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the device detects (836) a third touch input, and in accordance with a determination that the third touch input is a predefined third type of input, delivers to the application a sequence of two or more input events corresponding to the third touch input without varying a time interval between input times and delivery times for sequential input events in the sequence of the two or more input events. For example, in some embodiments, for a touch input of the predefined second or third type, the latency from input detection to delivery of the corresponding input event or events is invariant for that touch input. In some embodiments, the predefined third type of input is any touch input received while the electronic device, or at least a portion of the electronic device, is in the second state; and touch inputs detected while the device is in the second state are delivered to corresponding applications with normal delivery of touch events. Thus, touch inputs of the predefined third type that persist long enough to be detected two more times by the digitizer cause are processed by the AOP and AP so as to deliver to the application a sequence of two or more input events corresponding to the third touch input without varying a time interval between input times and delivery times for sequential input events in the sequence of the two or more input events.

Delivering to the application two or more input events corresponding to the third touch input without varying a time interval between input times and delivery times for sequential input events of the two or more input events provides improved visual feedback to a user (e.g., by providing fixed latency replay for touch inputs of the predefined third type). Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the first input event is a first touch event that includes touch information, the second input event is a second touch event that includes touch information, and the third input event is a third touch event that includes touch information. (838). For example, the touch information for each of these touch events includes data corresponding to one or more, or two or more, of the properties of a touch input discussed above with respect to FIG. 1C (e.g., a location, and optionally one or more of a timestamp, touch identifier, duration of a touch input, etc.). Delivering to the application touch events that include information efficiently provides information needed by the application to update a user interface (e.g., by delivering touch information as touch events), which enables the application to provide improved visual feedback to the user, enhances the operability of the device, and makes the user-device interface more efficient, which, additionally, reduces power usage and improves battery life of the device by enabling the user to use the device more quickly and efficiently.

In some embodiments, the method is performed at an electronic device, at least a portion of the electronic device having a first state and a second state, wherein in the first state the electronic device consumes less power than in the second state and in the second state the electronic device responds to inputs with a lower latency than in the first state, and the method includes providing an indicator in the first input event of the sequence of input events, the indicator specifying that at the first input time, the portion of the electronic device was in the first state (840). As discussed above with reference to FIGS. 5A, 5B, and 6A, providing an indicator in the first input event of the sequence of input events, specifying that at the first input time the portion of the electronic device was in the first state, enables the device to initiate time compression filtering of the detected touch input, which provides improved visual feedback to a user. Providing improved visual feedback to the user enhances the operability of the device and makes the user-device interface more efficient (e.g., allowing the user to start interacting with the device while the device is in a lower energy consumption mode), which, additionally, reduces power usage and improves battery life of the device by enabling the user to use the device more quickly and efficiently.

In some embodiments, the device detects (842) a fourth touch input; and determine if the fourth touch input is supported by the application, and in response to a determination that the touch input is not supported by the application, forgo delivering to the application a sequence (e.g., a second sequence) of input events based on the fourth touch input. As discussed with respect to FIG. 5A, in some embodiments, digitizer events for touch inputs that are not supported by the application are not delivered to the AOP 506, and as a result, the device forgoes delivering input events for such touch inputs to the application. Forgoing delivering to the application of a second sequence of input events based on the fourth touch input provides improved device performance, by avoiding further processing of touch inputs that are not supported by the application, which reduces power usage and improves battery life of the device.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. For brevity, these details are not repeated here.

The operations described above with reference to FIGS. 8A-8D, are, optionally, implemented by components depicted in FIGS. 1A-1B, 3, 4, and 5A.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device having a touch-sensitive surface and one or more processors:
   detecting a touch input;
   after a latency period, delivering to an application a sequence of input events that represent the touch input, including, in sequence:
   a first input event that represents the touch input at a first input time and is delivered at a first delivery time,
   a second input event that represents the touch input at a second input time and is delivered at a second delivery time, and
   a third input event that represents the touch input at a third input time and is delivered at a third delivery time, wherein:
   a time interval between the second input time and the second delivery time is smaller than a time interval between the first input time and the first delivery time, and
   a time interval between the third input time and the third delivery time is smaller than the time interval between the second input time and the second delivery time, wherein at least a portion of the electronic device has a first state and a second state, wherein in the first state the electronic device consumes less power than in the second state and in the second state the electronic device responds to inputs with a lower latency than in the first state, and the method includes detecting the touch input at the first input time while the portion of the electronic device is in the first state.

2. The method of claim 1, wherein the touch input has a duration greater than a predefined threshold.

3. The method of claim 1, wherein the touch input includes movement of the touch input greater than a predefined movement threshold.

4. A method, comprising:
   at an electronic device having a touch-sensitive surface and one or more processors:
   detecting a touch input;
   after a latency period, delivering to an application a sequence of input events that represent the touch input, including, in sequence:
   a first input event that represents the touch input at a first input time and is delivered at a first delivery time,
   a second input event that represents the touch input at a second input time and is delivered at a second delivery time, and
   a third input event that represents the touch input at a third input time and is delivered at a third delivery time, wherein:
   a time interval between the second input time and the second delivery time is smaller than a time interval between the first input time and the first delivery time, and a time interval between the third input time and the third delivery time is smaller than the time interval between the second input time and the second delivery time, wherein delivering to the application the sequence of input events comprises delivering a sequence of input events that replays the touch input at a rate that varies over time.

5. The method of claim 4, wherein the rate at which the touch input is replayed increases over time while at least a first portion of the touch input is replayed.

6. The method of claim 4, wherein the rate at which the touch input is replayed decreases over time while at least a second portion of the touch input is replayed.

7. The method of claim 4, wherein a respective input event delivered to the application after the first input time and before the third delivery time represents a portion of the touch input having a duration determined based on a difference between a most recent input time and an input time represented by an input event delivered to the application immediately preceding delivery of the respective input event.

8. The method of claim 1, further comprising: while delivering to the application the sequence of input events, changing a user interface based on the touch input.

9. The method of claim 8, wherein changing the user interface comprises moving one or more user interface elements based on a movement of the touch input.

10. The method of claim 8, wherein changing the user interface comprises changing an appearance of one or more user interface elements based on a duration of the touch input.

11. The method of claim 1, wherein the first delivery time is prior to the third input time such that the touch input continues to be detected after the first input event in the sequence of input events is delivered to the application.

12. The method of claim 1, further comprising: in response to detecting the touch input at the first input time, entering the second state.

13. The method of claim 1, further including detecting the touch input at the third input time while the portion of the electronic device is in the second state.

14. The method of claim 1, further comprising: delivering to the application a first input event in the sequence of input events at the first delivery time while the portion of the electronic device is in the second state.

15. The method of claim 1, further comprising detecting a second touch input, and in accordance with a determination that the second touch input is a predefined second type of input, delivering to the application a single input event corresponding to the second touch input.

16. The method of claim 1, further comprising detecting a third touch input, and in accordance with a determination that the third touch input is a predefined third type of input, delivering to the application a sequence of two or more input events corresponding to the third touch input without varying a time interval between input times and delivery times for sequential input events in the sequence of the two or more input events corresponding to the third touch input.

17. The method of claim 1, wherein the first input event is a first touch event that includes touch information, the second input event is a second touch event that includes touch information, and the third input event is a third touch event that includes touch information.

18. The method of claim 1, wherein the method includes providing an indicator in the first input event of the sequence of input events, the indicator specifying that at the first input time, the portion of the electronic device was in the first state.

19. The method of claim 1, further comprising:
detecting a fourth touch input; and
determining if the fourth touch input is supported by the application, and
in response to a determination that the fourth touch input is not supported by the application, forgoing delivering to the application a sequence of input events based on the fourth touch input.

20. An electronic device, comprising:
a touch-sensitive surface;
one or more processors;
memory storing one or more programs, the one or more programs including instructions for:
detecting a touch input;
after a latency period, delivering to an application a sequence of input events that represent the touch input, including, in sequence:
a first input event that represents the touch input at a first input time and is delivered at a first delivery time,
a second input event that represents the touch input at a second input time and is delivered at a second delivery time, and
a third input event that represents the touch input at a third input time and is delivered at a third delivery time, wherein:
a time interval between the second input time and the second delivery time is smaller than a time interval between the first input time and the first delivery time, and
a time interval between the third input time and the third delivery time is smaller than the time interval between the second input time and the second delivery time, wherein at least a portion of the electronic device has a first state and a second state, wherein in the first state the electronic device consumes less power than in the second state and in the second state the electronic device responds to inputs with a lower latency than in the first state, and the one or more programs further include instructions for detecting the touch input at the first input time while the portion of the electronic device is in the first state.

21. A non-transitory computer-readable storage medium, storing one or more programs, which, when executed by an electronic device having a touch-sensitive surface and one or more processors, cause the electronic device to:
after a latency period, following initial detection of a touch input on the touch-sensitive surface, deliver to an application a sequence of input events that represent the touch input, including, in sequence:
a first input event that represents the touch input at a first input time and is delivered at a first delivery time,
a second input event that represents the touch input at a second input time and is delivered at a second delivery time, and
a third input event that represents the touch input at a third input time and is delivered at a third delivery time, wherein:

a time interval between the second input time and the second delivery time is smaller than a time interval between the first input time and the first delivery time, and a time interval between the third input time and the third delivery time is smaller than the time interval between the second input time and the second delivery time, wherein at least a portion of the electronic device has a first state and a second state, wherein in the first state the electronic device consumes less power than in the second state and in the second state the electronic device responds to inputs with a lower latency than in the first state, and the one or more programs further cause the electronic device to detect the touch input at the first input time while the portion of the electronic device is in the first state.

22. The electronic device of claim 20, wherein the touch input has a duration greater than a predefined threshold.

23. The electronic device of claim 20, wherein the touch input includes movement of the touch input greater than a predefined movement threshold.

24. The electronic device of claim 20, wherein the one or more programs include instructions for: while delivering to the application the sequence of input events, changing a user interface based on the touch input.

25. The electronic device of claim 24, wherein changing the user interface comprises moving one or more user interface elements based on a movement of the touch input.

26. The electronic device of claim 24, wherein changing the user interface comprises changing an appearance of one or more user interface elements based on a duration of the touch input.

27. The electronic device of claim 20, wherein the first delivery time is prior to the third input time such that the touch input continues to be detected after the first input event in the sequence of input events is delivered to the application.

28. The electronic device of claim 20, wherein the one or more programs include instructions for: in response to detecting the touch input at the first input time, entering the second state.

29. The electronic device of claim 20, wherein the one or more programs include instructions for: detecting the touch input at the third input time while the portion of the electronic device is in the second state.

30. The electronic device of claim 20, wherein the one or more programs include instructions for: delivering to the application a first input event in the sequence of input events at the first delivery time while the portion of the electronic device is in the second state.

31. The electronic device of claim 20, wherein the one or more programs include instructions for: detecting a second touch input, and in accordance with a determination that the second touch input is a predefined second type of input, delivering to the application a single input event corresponding to the second touch input.

32. The electronic device of claim 20, wherein the one or more programs include instructions for: detecting a third touch input, and in accordance with a determination that the third touch input is a predefined third type of input, delivering to the application a sequence of two or more input events corresponding to the third touch input without varying a time interval between input times and delivery times for sequential input events in the sequence of the two or more input events corresponding to the third touch input.

33. The electronic device of claim 20, wherein the first input event is a first touch event that includes touch information, the second input event is a second touch event that includes touch information, and the third input event is a third touch event that includes touch information.

34. The electronic device of claim 20, wherein the one or more programs include instructions for: providing an indicator in the first input event of the sequence of input events, the indicator specifying that at the first input time, the portion of the electronic device was in the first state.

35. The electronic device of claim 20, wherein the one or more programs include instructions for:
detecting a fourth touch input; and
determining if the fourth touch input is supported by the application, and
in response to a determination that the fourth touch input is not supported by the application, forgoing delivering to the application a sequence of input events based on the fourth touch input.

36. An electronic device, comprising:
a touch-sensitive surface;
one or more processors;
memory storing one or more programs, the one or more programs including instructions for:
detecting a touch input;
after a latency period, delivering to an application a sequence of input events that represent the touch input, including, in sequence:
a first input event that represents the touch input at a first input time and is delivered at a first delivery time,
a second input event that represents the touch input at a second input time and is delivered at a second delivery time, and
a third input event that represents the touch input at a third input time and is delivered at a third delivery time, wherein:
a time interval between the second input time and the second delivery time is smaller than a time interval between the first input time and the first delivery time,
a time interval between the third input time and the third delivery time is smaller than the time interval between the second input time and the second delivery time,
a time interval between the second input time and the second delivery time is smaller than a time interval between the first input time and the first delivery time, and
a time interval between the third input time and the third delivery time is smaller than the time interval between the second input time and the second delivery time, wherein delivering to the application the sequence of input events comprises delivering a sequence of input events that replays the touch input at a rate that varies over time.

37. The electronic device of claim 36, wherein the rate at which the touch input is replayed increases over time while at least a first portion of the touch input is replayed.

38. The electronic device of claim 36, wherein the rate at which the touch input is replayed decreases over time while at least a second portion of the touch input is replayed.

39. The electronic device of claim 36, wherein a respective input event delivered to the application after the first input time and before the third delivery time represents a portion of the touch input having a duration determined based on a difference between a most recent input time and an input time represented by an input event delivered to the application immediately preceding delivery of the respective input event.

40. The non-transitory computer-readable storage medium of claim 21, wherein the touch input has a duration greater than a predefined threshold.

41. The non-transitory computer-readable storage medium of claim 21, wherein the touch input includes movement of the touch input greater than a predefined movement threshold.

42. The non-transitory computer-readable storage medium of claim 21, wherein the one or more programs include instructions that, when executed by the one or more processors, cause the electronic device to, while delivering to the application the sequence of input events, change a user interface based on the touch input.

43. The non-transitory computer-readable storage medium of claim 42, wherein changing the user interface comprises moving one or more user interface elements based on a movement of the touch input.

44. The non-transitory computer-readable storage medium of claim 42, wherein changing the user interface comprises changing an appearance of one or more user interface elements based on a duration of the touch input.

45. The non-transitory computer-readable storage medium of claim 21, wherein the first delivery time is prior to the third input time such that the touch input continues to be detected after the first input event in the sequence of input events is delivered to the application.

46. The non-transitory computer-readable storage medium of claim 21, wherein the one or more programs include instructions that, when executed by the one or more processors, cause the electronic device to in response to detecting the touch input at the first input time, enter the second state.

47. The non-transitory computer-readable storage medium of claim 21, wherein the one or more programs include instructions that, when executed by the one or more processors, cause the electronic device to detect the touch input at the third input time while the portion of the electronic device is in the second state.

48. The non-transitory computer-readable storage medium of claim 21, wherein the one or more programs include instructions that, when executed by the one or more processors, cause the electronic device to deliver to the application a first input event in the sequence of input events at the first delivery time while the portion of the electronic device is in the second state.

49. The non-transitory computer-readable storage medium of claim 21, wherein the one or more programs include instructions that, when executed by the one or more processors, cause the electronic device to detect a second touch input, and in accordance with a determination that the second touch input is a predefined second type of input, deliver to the application a single input event corresponding to the second touch input.

50. The non-transitory computer-readable storage medium of claim 21, wherein the one or more programs include instructions that, when executed by the one or more processors, cause the electronic device to detect a third touch input, and in accordance with a determination that the third touch input is a predefined third type of input, deliver to the application a sequence of two or more input events corresponding to the third touch input without varying a time interval between input times and delivery times for sequential input events in the sequence of the two or more input events corresponding to the third touch input.

51. The non-transitory computer-readable storage medium of claim 21, wherein the first input event is a first touch event that includes touch information, the second input event is a second touch event that includes touch information, and the third input event is a third touch event that includes touch information.

52. The non-transitory computer-readable storage medium of claim 21, wherein the one or more programs include instructions that, when executed by the one or more processors, cause the electronic device to provide an indicator in the first input event of the sequence of input events, the indicator specifying that at the first input time, the portion of the electronic device was in the first state.

53. The non-transitory computer-readable storage medium of claim 21, wherein the one or more programs include instructions that, when executed by the one or more processors, cause the electronic device to:
  detect a fourth touch input; and
  determine if the fourth touch input is supported by the application, and
  in response to a determination that the fourth touch input is not supported by the application, forgo delivering to the application a sequence of input events based on the fourth touch input.

54. A non-transitory computer-readable storage medium, storing one or more programs, which, when executed by an electronic device having a touch-sensitive surface and one or more processors, cause the electronic device to:
  after a latency period, following initial detection of a touch input on the touch-sensitive surface, deliver to an application a sequence of input events that represent the touch input, including, in sequence:
    a first input event that represents the touch input at a first input time and is delivered at a first delivery time,
    a second input event that represents the touch input at a second input time and is delivered at a second delivery time, and
    a third input event that represents the touch input at a third input time and is delivered at a third delivery time, wherein:
      a time interval between the second input time and the second delivery time is smaller than a time interval between the first input time and the first delivery time, and
      a time interval between the third input time and the third delivery time is smaller than the time interval between the second input time and the second delivery time, wherein delivering to the application the sequence of input events comprises delivering a sequence of input events that replays the touch input at a rate that varies over time.

55. The non-transitory computer-readable storage medium of claim 54, wherein the rate at which the touch input is replayed increases over time while at least a first portion of the touch input is replayed.

56. The non-transitory computer-readable storage medium of claim 54, wherein the rate at which the touch input is replayed decreases over time while at least a second portion of the touch input is replayed.

57. The non-transitory computer-readable storage medium of claim 54, wherein a respective input event delivered to the application after the first input time and before the third delivery time represents a portion of the touch input having a duration determined based on a difference between a most recent input time and an input time represented by an input event delivered to the application immediately preceding delivery of the respective input event.

* * * * *